United States Patent
Herzog

(10) Patent No.: US 11,554,542 B2
(45) Date of Patent: Jan. 17, 2023

(54) DEVICE FOR THE GENERATIVE PRODUCTION OF A THREE-DIMENSIONAL OBJECT

(71) Applicant: CL SCHUTZRECHTSVERWALTUNGS GMBH, Lichtenfels (DE)

(72) Inventor: Frank Herzog, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 83 days.

(21) Appl. No.: 15/773,926

(22) PCT Filed: Nov. 10, 2016

(86) PCT No.: PCT/EP2016/077227
§ 371 (c)(1),
(2) Date: May 4, 2018

(87) PCT Pub. No.: WO2017/084955
PCT Pub. Date: May 26, 2017

(65) Prior Publication Data
US 2018/0326655 A1    Nov. 15, 2018

(30) Foreign Application Priority Data
Nov. 16, 2015 (DE) .......................... 102015119745.6

(51) Int. Cl.
*B29C 64/153* (2017.01)
*B29C 64/277* (2017.01)
(Continued)

(52) U.S. Cl.
CPC ............ *B29C 64/153* (2017.08); *B22F 12/00* (2021.01); *B29C 64/277* (2017.08); *B22F 10/10* (2021.01);
(Continued)

(58) Field of Classification Search
CPC ... B29C 64/153; B29C 64/277; B22F 3/1055; B22F 2003/1056; Y02P 10/295; B33Y 30/00; B33Y 10/00
See application file for complete search history.

(56) References Cited

U.S. PATENT DOCUMENTS 9,573,385 B2    2/2017  Moench et al.
2003/0214571 A1*  11/2003  Ishikawa ............ B23K 26/0604
                                                          347/255
(Continued)

FOREIGN PATENT DOCUMENTS

DE    102005022308 A1    11/2006
DE    102013011675 A1    1/2015
(Continued)

OTHER PUBLICATIONS

International Search Report Corresponding to Application No. PCT/EP2016/077227 dated Feb. 27, 2017.
(Continued)

*Primary Examiner* — Timothy Kennedy
*Assistant Examiner* — Olukorede Esan
(74) *Attorney, Agent, or Firm* — Dority & Manning, P.A.

(57) ABSTRACT

A device (1) for the generative production of a three-dimensional object (2) by selectively solidifying construction material layers made of solidifiable construction material (3) layer by layer in a successive manner using at least one laser beam (5), comprising at least one device (4) for generating at least one laser beam (5) in order to selectively solidify individual construction material layers made of solidifiable construction material (3) layer by layer. The device (4) comprises at least one laser diode element (10) that is arranged or can be arranged directly over the construction plane (9) on which solidified construction material layers or construction material layers to be solidified are selectively formed and is designed to generate a laser beam
(Continued)

Figure 1:
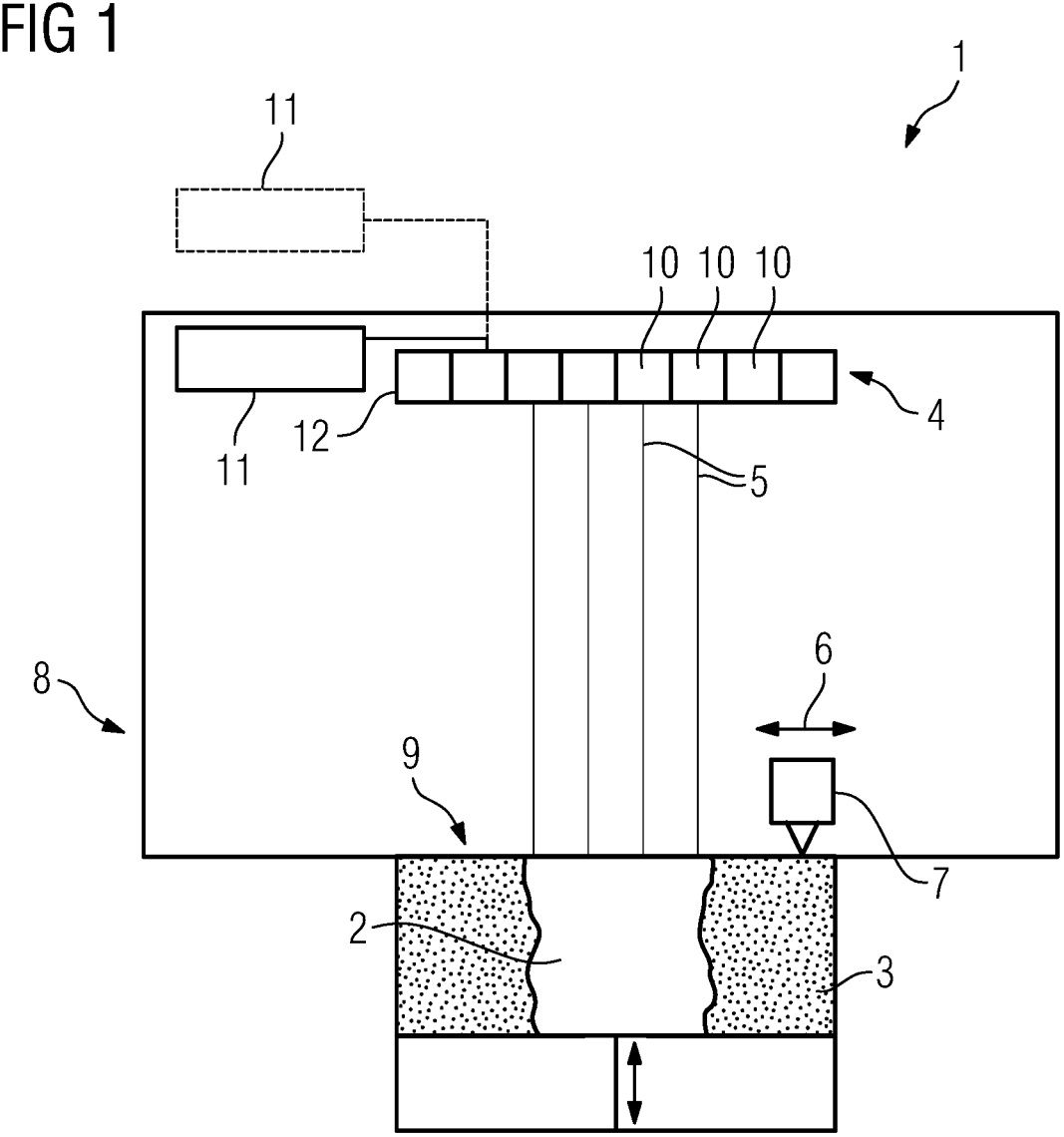

(5) directed directly onto the construction plane, and/or the device (4) comprises at least one laser diode element (10) and at least one optical element (27).

18 Claims, 8 Drawing Sheets

(51) Int. Cl.
  *B22F 12/00* (2021.01)
  *B33Y 10/00* (2015.01)
  *B33Y 30/00* (2015.01)
  *B22F 10/10* (2021.01)
(52) U.S. Cl.
  CPC .............. *B33Y 10/00* (2014.12); *B33Y 30/00* (2014.12); *Y02P 10/25* (2015.11)

(56) References Cited

U.S. PATENT DOCUMENTS

| | | | |
|---|---|---|---|
| 2014/0252687 A1* | 9/2014 | El-Dasher | B23K 26/0622 264/497 |
| 2014/0263209 A1* | 9/2014 | Burris | B23K 26/034 219/121.62 |
| 2014/0265049 A1 | 9/2014 | Burris et al. | |
| 2015/0165556 A1* | 6/2015 | Jones | B29C 64/268 264/482 |

FOREIGN PATENT DOCUMENTS

| | | |
|---|---|---|
| DE | 112008000030 B4 | 7/2015 |
| JP | 2016/522312 A | 7/2016 |
| JP | 2016/528374 A | 9/2016 |
| JP | 2017/502843 A | 1/2017 |
| WO | 2014199149 A1 | 12/2014 |
| WO | WO2015/134075 A2 | 9/2015 |

OTHER PUBLICATIONS

Machine Translated Japanese Search Report Corresponding to Application No. 2017555669 dated Nov. 27, 2018.
Chinese Search Report Corresponding to Application No. 2016800193073 dated Jan. 23, 2019.

* cited by examiner

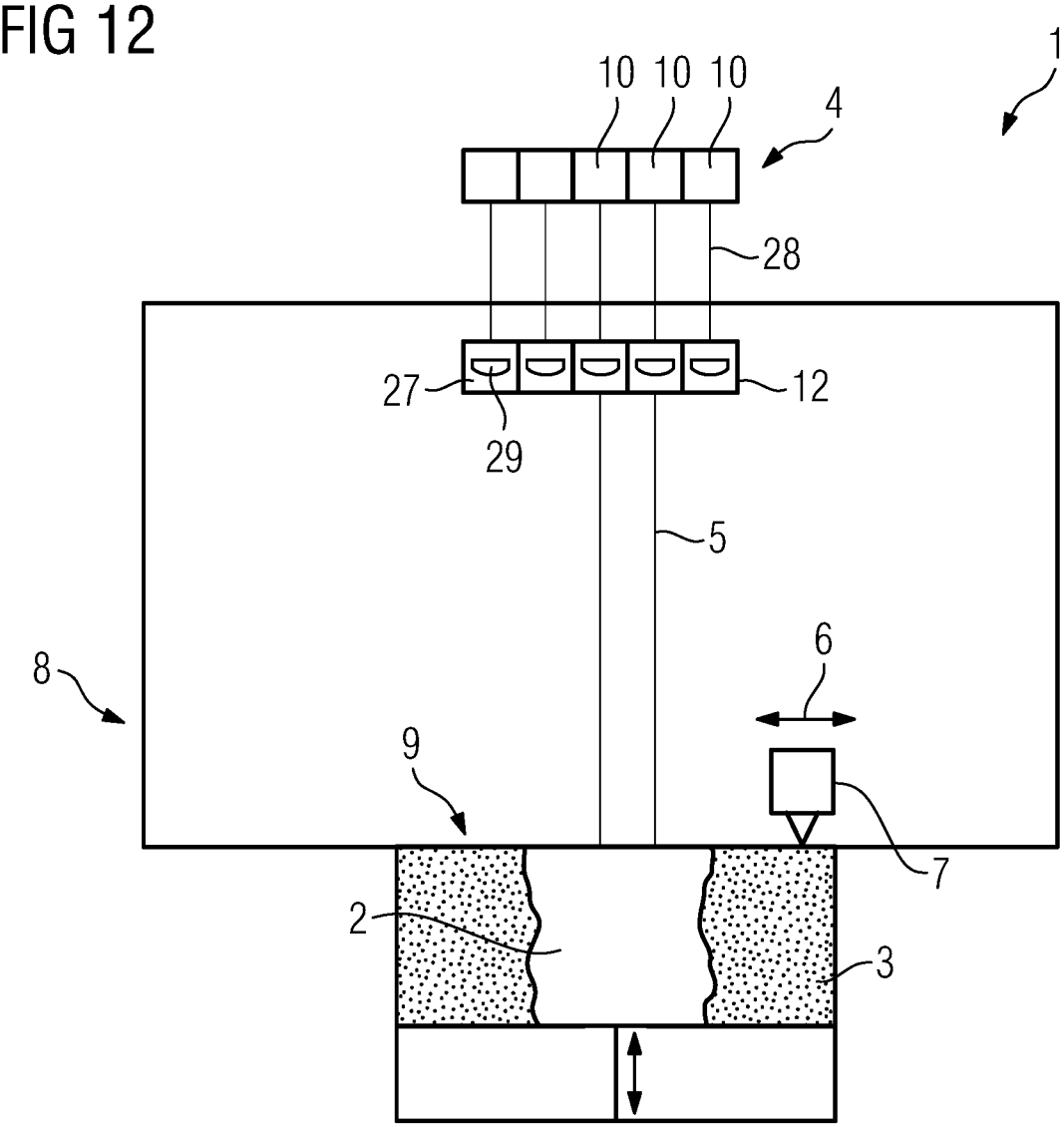

DEVICE FOR THE GENERATIVE PRODUCTION OF A THREE-DIMENSIONAL OBJECT

CROSS-REFERENCE TO RELATED APPLICATIONS

This application is a United States national stage entry of an International Application serial no. PCT/EP2016/077227 filed Nov. 10, 2016 which claims priority to German Patent Application serial no. 10 2015 119 745.6 filed Nov. 16, 2015. The contents of these applications are incorporated herein by reference in their entirety as if set forth verbatim.

DESCRIPTION

The invention relates to an apparatus for the generative production of a three-dimensional object by successive, selective layer-by-layer solidification of construction material layers of a solidifiable construction material by means of at least one laser beam, comprising at least one device for generating at least one laser beam for layer-by-layer selective solidification of individual construction material layers of a solidifiable construction material.

Such apparatuses are for known in and of themselves for the generative production of three-dimensional objects. Appropriate apparatuses are used for generatively building up three-dimensional objects to be produced by successive, selective layer-by-layer solidification by means of an energy or laser beam of construction material layers of a solidifiable construction material applied in a construction plane in respective cross-sectional zones of the zones corresponding to the particular objects to be produced. Successive selective layer-by-layer solidification of the construction material layers to be solidified proceeds on the basis of geometric shape, i.e. in particular the layer-related cross-sectional geometries of the construction data of the particular three-dimensional object to be produced.

Corresponding laser beams are generated by a laser beam generation device, which is typically arranged outside the construction or process chamber belonging to the apparatus. A laser beam generated by means of a corresponding laser beam generation device is directed via a beam deflection device also known as a "scanner" onto a construction material layer to be selectively solidified.

This configuration of corresponding apparatuses is comparatively complex, in particular with regard to plant engineering, and inasmuch in need of further development.

The object of the present invention is to provide an apparatus for the generative production of a three-dimensional object which is improved in particular with regard to a device for generating a laser beam which is of a comparatively simple design with regard to plant engineering.

The object is achieved by an apparatus according to the claims. The dependent claims relate to particular embodiments of the apparatus. The object is furthermore achieved by a method according to the claims.

The apparatus described herein serves in general for the additive or generative production of at least one three-dimensional object, i.e. for example an industrial component or an industrial component assembly, by successive, selective layer-by-layer solidification of individual construction material layers of a solidifiable construction material by means of at least one laser beam generated by at least one device. The apparatus may be an apparatus for carrying out selective laser melting methods or selective laser sintering methods.

The successive, selective layer-by-layer solidification of a construction material layer to be solidified proceeds on the basis of object-related construction data. Corresponding construction data generally describe the geometric or geometric-structural shape of the particular three-dimensional object to be produced generatively (hereinafter "object" for short). Corresponding construction data may be or contain for example CAD data of the object to be produced.

The apparatus comprises the functional components typically required for carrying out generative construction processes, i.e. in particular a laser beam generation device, designated "device" for short, for generating a laser beam for successive, selective layer-by-layer solidification of individual construction material layers of a construction material, i.e. in particular a pulverulent metal, plastics and/or ceramic material, and a coater device for forming construction material layers to be solidified in a construction plane. The construction plane may be a surface of a carrier element, typically supported movably (in a vertical direction), of a carrier device or an already solidified construction material layer. In general, construction material layers which are to be or have been selectively solidified are formed in a construction plane.

The device may comprise at least one, i.e. typically a plurality of, laser diode element(s) which is/are arrangeable or arranged directly above the construction plane and is/are configured to generate a laser beam directed directly onto the construction plane. The laser diode element(s) is/are here typically arranged within a construction or process chamber belonging to the apparatus and in which generative construction operations are carried out.

Alternatively or in addition, the device may comprise at least one, i.e. typically a plurality of, optical element(s) which is/are (optically) coupled with at least one laser diode element, is/are arrangeable or arranged directly above the construction plane and is/are configured to deflect a laser beam generated by the laser diode element directly onto the construction plane. The laser diode element(s) is/are here typically arranged outside a construction or process chamber belonging to the apparatus and in which generative construction operations are carried out. An optical element may take the form of or at least comprise a focusing optical system comprising one or more optical lens elements for focusing a laser beam onto the construction plane. An optical element and a laser diode element are (optically) coupled via a light guide element, for example in the form of one or more glass fiber cable(s). It is, of course, possible to couple at least one optical element with a plurality of laser diode elements or to couple at least one laser diode element via suitable beam splitting elements with a plurality of optical elements.

Irrespective of the arrangement of the laser diode elements and the corresponding provision of coupled optical elements, laser beams generated by the device typically impinge on the construction plane at an angle of approx. 90° relative to the plane of the construction plane. The device may accordingly be denoted or considered a "diode laser" since it comprises laser diode elements for generating laser beams or laser radiation. A laser diode element should be taken to be a semiconductor element configured to generate laser radiation. The characteristics, i.e. in particular the optical characteristics, i.e. for example the wavelength, of the laser beam which is generable by means of a laser diode element are inter alia dependent on the semiconductor material(s) used. The laser diode elements belonging to the device may for example generate emitted laser powers in the range between 0.1 and 10 watts; exceptionally, higher and/or lower outputs are, of course, conceivable.

The laser diode elements or optical elements belonging to the device are arranged directly above the construction plane; no further component, in particular no optical mask component, is typically located between the laser diode elements or optical elements and the construction plane. The laser beams are accordingly directed directly onto the construction plane and impinge directly on the construction plane. It is not necessary to deflect the laser beams by means of a beam deflection device.

Overall, the apparatus described herein for the generative production of three-dimensional objects offers a structure which is simplified in plant engineering terms; an improved apparatus for the generative production of three-dimensional objects is thus provided.

The device may, as mentioned, comprise two or more, i.e. a plurality of, laser diode elements or optical elements. The laser diode elements or optical elements may cover at least a part of the area of the construction plane, optionally also the complete area of the construction plane. The construction plane may typically be defined by a specific, for example quadrangular, area. The laser diode elements or optical elements are accordingly located directly opposite at least a part, i.e. a partial area/surface of the total area/surface, of the construction plane. The laser diode elements or optical elements may, of course, also be located opposite a plurality of parts or partial areas of the construction plane which are contiguous or non-contiguous in area terms. A part of the area of the construction plane which is covered by means of corresponding laser diode elements or optical elements can be selectively exposed without necessarily requiring mechanical movement of the laser diode elements or optical elements relative to the construction plane. Selective exposure proceeds by targeted driving of individual, a plurality of or all of the laser diode elements for respectively generating a laser beam with specific beam characteristics.

In this respect, it may be convenient for the laser diode elements or optical elements to cover the entire area of the construction plane, such that in principle any part or the total area of the construction plane can be selectively exposed as required without moving the device relative to the construction plane. This is a particular advantage over conventional apparatuses which, for selectively exposing a construction plane, typically comprise a beam deflection device for deflecting a generated laser beam and/or a movement mechanism for moving a laser beam generation device. These devices or the mechanisms belonging thereto of conventional apparatuses were structurally complex and sometimes problematic with regard to carrying out high precision exposure operations. A further advantage over conventional apparatuses is that "non-productive time" of the apparatus attributable to the movement of a laser beam generation device can be reduced or avoided.

The laser diode elements or optical elements of the device are in principle arrangeable or arranged in any desired spatial arrangements relative to one another. The laser diode elements or plurality of laser diode elements as a subset of a total number of laser diode elements present in the apparatus, or the optical elements or a plurality of optical elements as a subset of a total number of optical elements present in the apparatus may be arranged in rows and/or columns in at least one common plane (typically lying parallel to the construction plane). Arranging laser diode elements or optical elements in contiguous rows and columns may be denoted a "matrix arrangement", or "matrix" for short. A matrix accordingly comprises at least one row, typically a plurality of rows arranged in parallel, (each) made up of at least two laser diode elements or optical elements and at least one column, typically a plurality of columns arranged in parallel, (each) made up of at least two laser diode elements or optical elements. A corresponding column of laser diode elements or optical elements extends at an angle, in particular perpendicular, to a corresponding row of laser diode elements or optical elements and vice versa. A matrix arrangement of laser diode elements or optical elements may correspond to a pixel grid, as is for example provided in liquid crystal display devices ("LCD displays"); the individual laser diode elements or optical elements here correspond to the pixels of corresponding liquid crystal display devices.

It should be noted at this point that laser diode elements, again in accordance with the principle of a liquid crystal display device, may in principle be drivable, i.e. in particular activatable and/or deactivatable, individually or in groups for respectively generating a laser beam with specific beam characteristics. Activation or deactivation of a laser diode element may be taken to mean energizing the laser diode element; in an activated state, the laser diode element is energized and generates a laser beam and, in a deactivated state, is not energized and does not generate a laser beam. Activation or deactivation of a laser diode element may also be taken to mean that the laser beam generable or generated by means of the laser diode element is directed in an activated state of the laser diode element onto the construction plane for example by moving, in particular pivoting, the laser diode element, and, in a deactivated state of the laser diode element, is directed away from the construction plane. Similarly, optical elements may also be directed onto the construction plane and directed away from the construction plane.

In addition to the described arrangement of corresponding laser diode elements or optical elements in a common plane, the laser diode elements or a plurality of laser diode elements as a subset of a total number of laser diode elements present in the apparatus, or the optical elements or a plurality of optical elements as a subset of a total number of optical elements present in the apparatus may be arranged in a plurality of planes (typically lying parallel to the construction plane) arranged one above the other. An arrangement of laser diode elements or optical elements in a plurality of planes one above the other gives rise to a particularly compact, optionally interleaved, arrangement of corresponding laser diode elements or optical elements. The arrangement of the laser diode elements or optical elements in a plurality of planes one above the other may of course be selected such that the laser beams may in each case be directed directly onto the construction plane. The laser diode elements or optical elements arranged in respective planes lying one above the other are typically arranged in a specific spatial offset relative to one another. The laser beam generated by a laser diode element arranged in an upper plane thus does not impinge on an element arranged in a lower plane, but instead passes through a space, for example in the form of a slot, a bore or other opening, between laser diode elements and/or optical elements arranged directly adjacently in a lower plane onto the construction plane. Similarly, the laser beam deflected on an optical element arranged in an upper plane does not impinge on an element arranged in a lower plane, but instead passes through a space, for example in the form of a slot, a bore or other opening, between laser diode elements and/or optical elements arranged directly adjacently in a lower plane onto the construction plane.

Independently of the arrangement of laser diode elements or optical elements in one or more planes lying one above the other, the laser diode elements or a plurality of laser diode elements as a subset of a total number of laser diode elements present in the apparatus, or the optical elements or a plurality of optical elements as a subset of a total number of optical elements present in the apparatus may be arrangeable or arranged in relation to an optionally cross-sectional outer and/or inner contour of an object to be produced. The mentioned aspect of the in principle arbitrary spatial arrangement of laser diode elements or optical elements relative to one another makes it possible to arrange laser diode elements or optical elements with regard to a specific outer and/or inner contour of an object to be produced, such that the arrangement of the laser diode elements or optical elements permits exposure of the outer and/or inner contour of the object to be produced. This applies irrespective of the geometric shape of the object to be produced, since the laser diode elements or optical elements may be arranged with regard to the geometric shape of an object to be produced in such a manner that they cover the in particular cross-sectional maximum or minimum spatial dimensions of the object to be produced.

As is described below in connection with a convenient mounting device, on or in which laser diode elements or optical elements are arrangeable, it is possible for laser diode elements or optical elements to be arrangeable or arranged, with regard to a specific outer and/or inner contour of an object to be produced, in groups preconfigured in a specific spatial arrangement relative to one another. A preconfigured group may, of course, also comprise laser diode elements and optical elements. If an object to be produced has, for example, a triangular cross-section, a preconfigured group of laser diode elements comprises laser diode elements in a corresponding triangular arrangement. Similarly, a preconfigured group of optical elements comprises optical elements in a corresponding triangular arrangement. Since a plurality of objects of a geometrically different shape may be produced in a generative construction operation, a plurality of differently preconfigured groups of laser diode elements or optical elements may, of course, also be present.

Individual, a plurality of or all of the laser diode elements may be variable in at least one parameter relating to the beam characteristics of the laser beam generable thereby, in particular in the input and/or output power thereof. Individual, a plurality of or all of the laser diode elements may accordingly be "dimmable" in a similar manner to a dimmable LED. Correspondingly, laser beams with different beam characteristics, i.e. for example a different energy density, intensity etc., may be generated by means of a laser diode element variable in at least one parameter relating to the beam characteristics, for example by varying the input and/or output power. In the case of a plurality of laser diode elements correspondingly variable in at least one parameter relating to the beam characteristics, it is accordingly possible to form specific overall beam energy profiles while simultaneously generating a plurality of laser beams. An arrangement of a plurality of laser diode elements or optical elements in a row may for example be considered, in which the laser diode elements are driven or varied in the output power thereof in such a manner that an overall beam energy profile with a specific geometric shape is obtained; to obtain a Gaussian overall beam energy profile, centrally arranged laser diode elements or optical elements are supplied with a higher power in comparison with peripherally arranged laser diode elements or optical elements. A Gaussian overall beam energy profile should, of course, only be taken by way of example and in principle overall beam energy profiles of any desired two- or three-dimensional geometric shape are generable by driving the laser diode elements appropriately.

An arrangement in rows or columns of a plurality of laser diode elements variable in at least one parameter relating to the beam characteristics of the laser beam generable thereby or of optical elements coupled with such laser diode elements furthermore means that the laser diode elements may be driven or varied in the output power thereof in such a manner that an overall beam energy profile movable or moving, optionally to and fro, in accordance with a wavefront along the arrangement of laser diode elements or optical elements in rows or columns along the construction plane, thus a dynamic overall beam energy profile, is obtained. The laser diode elements are driven for this purpose in a similar manner to an LED display for the moving display of alphanumeric symbols which comprises a plurality of LEDs. The laser diode elements or optical elements correspond to the LEDs belonging to the LED display. By driving the laser diode elements as described, the overall beam energy profile may have a specific geometric shape, i.e. for example be of Gaussian configuration.

The principles may, of course, also be transferred to a matrix arrangement of a plurality of laser diode elements or optical elements. Immobile or moving overall beam energy profiles having cross-sectional profiles which are identical, similar or different at least in portions, or in general overall beam energy profiles of any desired three-dimensional geometric shape, may be achieved in this manner.

In general, individual, a plurality of or all of the laser diode elements may differ in at least one parameter relating to the beam characteristics of the respective laser beam generable thereby. The formation of specific two- or three-dimensional overall beam energy profiles having cross-sectional profiles which are identical, similar or different at least in portions may accordingly also be achieved by laser diode elements which differ in at least one parameter relating to the beam characteristics of the respective laser beam generable thereby, i.e. for example in the input and/or output power thereof. An arrangement in rows or columns may for example again be considered of a plurality of laser diode elements which differ in at least one parameter relating to the beam characteristics of the respective laser beam generable thereby, in which the laser diode elements are arranged such that a specific overall beam energy profile with a specific geometric shape is obtained; in the case of a Gaussian overall beam energy profile, centrally arranged laser diode elements have for example a higher output power in comparison with peripherally arranged laser diode elements. A Gaussian overall beam energy profile should, of course, here too only be taken by way of example and in principle overall beam energy profiles of any desired two-dimensional geometric shape are also generable by a corresponding arrangement of laser diode elements which differ in at least one parameter relating to the beam characteristics of the respective laser beam generable thereby. A similar situation of course applies to an arrangement of a plurality of optical elements in rows or columns.

Different functions, i.e. in particular thermal pretreatment of (yet) to be solidified construction material layers and/or thermal posttreatment of already solidified construction material layers, may be achieved by means of laser beams generable by correspondingly different laser diode elements. For example, at least one first laser diode element, optionally also a group of first laser diode elements, may be configured to generate a laser beam for solidifying construction material layers to be solidified and at least one further laser diode element, optionally also a group of further laser diode elements, may be configured to generate a laser beam for the thermal pretreatment of construction material layers to be solidified and/or to generate a laser beam for the thermal posttreatment of already solidified construction material layers. A laser beam generated for solidifying construction material layers typically has a higher energy (density) than a laser beam generated for the thermal pre- or posttreatment of construction material layers which are to be solidified or are already solidified.

It has already been mentioned that the laser diode elements or optical elements may conveniently be arrangeable or arranged on a mounting device. Such a, typically frame-like, mounting device comprises a number of predeterminable or predetermined arrangement positions, at or in which at least one laser diode element or at least one optical element is arrangeable. Such a mounting device may have any desired basic shape. The basic shape of the mounting device is typically dimensioned such that the mounting device is straightforwardly arrangeable in a construction or process chamber of the apparatus.

The laser diode elements or optical elements may be arrangeable or arranged as required, in particular detachably (without suffering damage or destruction) at predeterminable or predetermined arrangement positions in such a mounting device. A detachable connection may for example be convenient in the event of a defect in a laser diode element or an optical element, since the defective laser diode element or optical element can straightforwardly be removed from the mounting device and replaced.

In this connection, a detection device for detecting a defective laser diode element or a defective optical element may be convenient, which device, on detecting a defective laser diode element or optical element, for example acoustically and/or optically outputs an item of information relating to a defective laser diode element or optical element. The item of information may contain details about technical specifications, for example type, of the defective laser diode element or optical element, the precise nature of the defect, the arrangement or position of the defective laser diode element or optical element on or in the mounting device, etc. A replacement device which interacts with the detection device for partially or completely automatic replacement of defective laser diode elements or defective optical elements is furthermore conceivable, such that the apparatus can always be partially or completely automatically equipped with a complete number of laser diode elements or optical elements. A corresponding replacement device comprises a number of gripper elements for gripping laser diode elements or optical elements in the course of replacement. The replacement device may for example take the form of a single or multiple axis robot device or comprise at least one such.

By arranging laser diode elements or optical elements as required at predeterminable or predetermined arrangement positions of the mounting device, it is possible for laser diode elements or optical elements to be arrangeable or arranged, with regard to an optionally cross-sectional outer and/or inner contour of an object to be produced, in groups preconfigured in a specific spatial arrangement relative to one another as required at predeterminable or predetermined arrangement positions of the mounting device. It is thus possible in connection with the generative production of an object with a specific outer and/or inner contour to prepare at least one preconfigured group of laser diode elements or optical elements formed of laser diode elements or optical elements arranged in a specific spatial arrangement relative to one another, to connect said preconfigured group to the mounting device, i.e. for example to insert it into the mounting device, for carrying out generative production of the object, and, once the object has been produced, to remove it from the mounting device or, for subsequent production of another object with a different outer and/or inner contour, to replace it with another group of laser diode elements or optical elements preconfigured, with regard to the outer and/or inner contour of the other object, in a specific spatial arrangement relative to one another.

Respective preconfigured groups of laser diode elements or optical elements are thus in principle associable or associated with an object with a specific geometric shape, i.e. in particular with a specific outer and/or inner contour. Respective preconfigured groups of laser diode elements or optical elements may be kept in (intermediate) storage in a store while retaining the arrangement of the laser diode elements or optical elements and used as often as desired for the generative production of said respectively associated objects. It is, of course, also possible to reconfigure a preconfigured group of laser diode elements or optical elements with regard to the geometric shape of another object by rearranging individual, a plurality of or all of the laser diode elements or optical elements in a similar manner to a typecase ("typecase principle").

In order to arrange the laser diode elements on or in the mounting device, the mounting device may comprise a number of receiving means for receiving at least one laser diode element or optical element. The number of receiving means typically at least corresponds to the number of laser diode elements or optical elements of the device. The receiving means may comprise specific connection elements which interact with corresponding mating connection elements arranged or formed on the laser diode elements or optical elements to form a (positionally) stable, detachable (without suffering damage or destruction) or nondetachable connection of the laser diode elements or optical elements with the mounting device. By means of the interaction of corresponding connection elements and corresponding mating connection elements, a form- and/or force-locking connection can be produced; the connection elements may for example take the form of form- and/or force-locking elements, i.e. for example insertion elements, such as insertion pins or insertion receptacles corresponding thereto, and/or latching/snap-fit elements, such as latching/snap-fit projections or recesses corresponding thereto, and/or screw/threaded elements, such as bolts or stud bolts or screw or threaded receptacles corresponding thereto, etc. The mating connection elements may for this purpose take the form of corresponding form- and/or force-locking elements. Laser diode elements or optical elements may, of course, also be bonded, i.e. for example adhesively bonded, to the mounting device.

The mounting device may be movably supported with at least one degree of freedom of movement relative to the construction plane. The mounting device is moved by means of a suitable, i.e. in particular (electric) motor-powered, drive and/or guidance device couplable or coupled therewith. By moving the mounting device, it is possible to move the mounting device together with laser diode elements or optical elements arranged thereon or therein relative to the construction plane to be exposed with regard to a specific exposure situation. Movement of the mounting device may include translational degrees of freedom of movement along at least one axis of translation and/or rotational degrees of freedom of movement about at least one axis of rotation. The movement of the mounting device may accordingly for example be a linear, rotary, tilt or pivot movement. Combined movements in a plurality of different degrees of freedom of movement are, of course, possible.

Movement of the mounting device may proceed simultaneously with the exposure of the construction plane. In connection with the exposure of the construction plane, the mounting device may also be moved in different degrees of freedom of movement or in different trajectories relative to the construction plane. In this manner, different solidification structures, i.e. for example weld seams, may be formed in the construction material layer to be solidified. Internal stresses arising during processing in the object to be produced may accordingly be reduced, which has a positive impact on the quality of the object to be produced. For the example of a mounting device with laser diode elements or optical elements arranged thereon or therein in rows or columns, the mounting device may initially be moved over the construction plane for example along a first trajectory defined by a first, for example linear, movement axis and subsequently over the construction plane along a further trajectory defined by a further, for example linear, movement axis. The further trajectory may extend for example at an angle, in particular orthogonally, to the first trajectory. The same approach may, of course, also be applied to laser diode elements or optical elements arranged in a different manner, i.e. for example in a matrix.

In the event that the mounting device is not movably supported relative to the construction plane, the device conveniently comprises a plurality of laser diode elements or optical elements which cover at least at part or a subarea of the construction plane, in particular the complete construction plane. In particular where the complete area of the construction plane is covered by an arrangement of laser diode elements or optical elements which corresponds in area, it is not necessary to move the mounting device together with laser diode elements or optical elements arranged thereon or therein relative to the construction plane with regard to a specific exposure situation. In this case, there is no need to provide any drive and/or guidance devices couplable or coupled with the mounting device which may optionally complicate the structure of the apparatus in plant and control terms.

Irrespective of whether the mounting device is supported movably or immovably relative to the construction plane, at least one laser diode element or at least one optical element may (also) be arrangeable or arranged on or in the mounting device in at least one degree of freedom of movement relative to the mounting device and thus also movably relative to the construction plane. By moving individual, a plurality of or all of the laser diode elements or optical elements relative to the mounting device, it is for example possible to move the laser diode elements or optical elements relative to the construction plane with regard to a specific exposure situation. It is likewise possible to move, i.e. in particular to tilt or pivot, individual, a plurality of or all of the laser diode elements or optical elements into a deactivated state in which a respective generable or generated laser beam is directed away from the construction plane. Movement of a laser diode element or optical element may include translational degrees of freedom of movement along at least one axis of translation and/or rotational degrees of freedom of movement about at least one axis of rotation. The movement of a laser diode element or an optical element may accordingly for example be a linear, rotary, tilt or pivot movement. Combined movements in a plurality of different degrees of freedom of movement are, of course, possible here too.

The laser diode elements or optical elements may also be moved simultaneously with the exposure of the construction plane. Individual, a plurality of or all of the laser diode elements or optical elements may also be moved in connection with the exposure of a specific construction plane in different degrees of freedom of movement or in different trajectories relative to the construction plane. In this manner too, different solidification structures, i.e. for example weld seams, may be formed in the construction material layer to be solidified. Internal stresses arising during processing in the object to be produced may accordingly be reduced, which has a positive impact on the quality of the object to be produced. Individual, a plurality of or all of the laser diode elements or optical elements may initially be moved over a construction plane for example along a first trajectory defined by a first, for example linear, movement axis and subsequently over the construction plane along a further trajectory defined by a further, for example linear, movement axis. The further trajectory may extend for example at an angle, in particular orthogonally, to the first trajectory.

A coater device, typically belonging to the apparatus, for forming a construction material layer to be solidified may be arranged or formed on the mounting device. This is a particularly compact option for integrating a coater device into the apparatus. In order to form a construction material layer, the coater device arranged or formed on the mounting device may be moved relative to the construction plane, for example together with the movably supported mounting device.

The coater device may conveniently also be arranged or formed on the mounting device movably in at least one degree of freedom of movement relative to the mounting device. Drive and/or guidance devices, in particular (electric) motor-powered, couplable or coupled with the coater device may be provided for moving the coater device relative to the mounting device and thus also relative to the construction plane. In particular in this case it is possible to carry out coating operations and exposure operations simultaneously; conveniently in this case only those parts of the construction plane in which a construction material layer has already been formed by the coater device are exposed.

The apparatus may comprise a detection device for detecting the temperature and/or melt (pool) characteristics of a construction material layer which is to be solidified, is in the course of solidifying or has already completely solidified. The detection device may take the form of a pyrometer or comprise at least one such. The detection device may also be arranged or formed on the mounting device. This is a particularly compact option for integrating a corresponding detection device into the apparatus. The temperature values or melt (pool) characteristics detected by means of the detection device may be used as the basis for a thermal pretreatment of a construction material layer to be solidified or a thermal posttreatment of an already solidified construction material layer.

The detection device may conveniently also be arranged or formed on the mounting device movably in at least one degree of freedom of movement relative to the mounting device. Drive and/or guidance devices, in particular (electric) motor-powered, couplable or coupled with the detection device may be provided for moving the detection device relative to the mounting device and thus also relative to the construction plane. In particular in this case it is possible to carry out detection operations and exposure operations simultaneously; in this case it is possible to expose parts of the construction plane which are yet to solidify or are already solidified. The exposure parameters may be adjusted as a function of the detected temperature or melt (pool) characteristics.

The apparatus may furthermore comprise at least one evaluation device for evaluating, in particular optically, the surface quality and/or melt (pool) characteristics of a construction material layer which is to be solidified, is in the course of solidifying or has (already) solidified. The evaluation device may take the form of a camera or comprise at least one such. The evaluation device may also be arrangeable or arranged on or in the mounting device movably, in particular in at least one degree of freedom of movement, relative to the mounting device. In particular in this case it is possible to carry out coating operations, exposure operations and evaluation operations simultaneously; conveniently in this case only those parts of the construction plane in which a construction material layer has already been formed and exposed are evaluated.

The mounting device may comprise a plurality of mounting device segments, wherein at least two mounting device segments are arranged movably in at least one degree of freedom of movement relative to the construction plane and/or in at least one degree of freedom of movement relative to one another. Movement of the mounting device segments may include translational degrees of freedom of movement along at least one axis of translation and/or rotational degrees of freedom of movement about at least one axis of rotation. The movement of a mounting device segment may accordingly for example be a linear, rotary, tilt or pivot movement relative to the construction plane and/or relative to at least one further mounting device segment. Movement of mounting device segments in at least one degree of freedom of movement relative to the construction plane and/or in at least one degree of freedom of movement relative to one another may proceed alternatively or in addition to a movement of the entire mounting device relative to the construction plane.

A number of laser diode elements or optical elements, for example arranged in rows and/or columns, are arranged on at least one first mounting device segment for exposure of a construction material layer to be solidified. A further number of laser diode elements or optical elements for thermal pretreatment of a construction material layer to be solidified and/or for thermal posttreatment of an already solidified construction material layer may be arranged on at least one further mounting device segment. Alternatively or in addition, at least one further functional component of the apparatus may be arranged on at least one further mounting device segment. Such a further functional component may for example be an application or dispensing device for applying a specific quantity of construction material onto a construction plane, a coater device for forming a construction material layer to be solidified, an evaluation device for evaluating, in particular optically, the surface quality or melt (pool) characteristics of a construction material layer which is to be solidified, is (in the course of) solidifying and/or has solidified or a detection device for detecting the temperature and/or melt (pool) characteristics of a construction material layer which is to be solidified, is (in the course of) solidifying or has already solidified, etc.

One specific example of a mounting device comprising a plurality of mounting device segments comprises four mounting device segments, for example arranged in a cross, which are movable individually, in groups or as a whole relative to the construction plane and/or individually or in groups relative to one another. An application or dispensing device may be arranged on a first mounting device segment, a coater device on a second mounting device segment, a number of laser diode elements or optical elements for exposure of a construction material layer to be solidified on a third mounting device segment and a detection device for detecting the temperature and/or melt (pool) characteristics on a fourth mounting device segment.

A further specific example of a mounting device comprising a plurality of mounting device segments comprises six mounting device segments, for example arranged in a cross, which are movable individually, in groups or as a whole relative to the construction plane and/or individually or in groups relative to one another. An application or dispensing device may be arranged on a first mounting device segment, a coater device on a second mounting device segment, a detection device for detecting the temperature and/or melt (pool) characteristics on a third mounting device segment, a number of laser diode elements or optical elements for exposure of a construction material layer to be solidified on a fourth mounting device segment, a detection device for detecting the temperature and/or melt (pool) characteristics on a fifth mounting device segment and an evaluation device for evaluating, in particular optically, the surface quality and/or melt (pool) characteristics on a sixth mounting device segment.

All the functional components of the apparatus, i.e. for example the mounting device or corresponding mounting device segments, the coater device, the detection device, the evaluation device, which are supported movably in at least one degree of freedom of movement may, of course, be movable by means of one or more common, in particular (electric) motor-powered, drive and/or guidance device(s).

The apparatus may comprise a simulation device which is configured for simulating at least one object-related object parameter, which is modifiable in the course of carrying out a generative construction process, of the object which is to be or has been produced generatively. On the basis of or taking account of various items of information of relevance to the particular object parameter to be simulated, such as for example information about the construction material used in the course of carrying out the generative construction process, information about various characteristics, for example density, geometry, etc., of the object which is to be or has been produced generatively, etc., the simulation device can simulate at least one object-related object parameter which is modifiable with the apparatus in the course of carrying out a generative construction process. The simulation device implemented for example in hardware and/or software may be provided for this purpose with suitable simulation algorithms.

A corresponding object-related object parameter modifiable in the course of carrying out a generative construction process may be, for example, the heat flow through the object which is to be or has been produced generatively which arises in the course of carrying out a generative construction process and/or the temperature or the temperature distribution of the object which is to be or has been produced generatively or in general specific thermal properties of the object which is to be or has been produced generatively. Alternatively or in addition, it is also conceivable for the object-related object parameter to be mechanical loads, in particular stresses, which may arise in the three-dimensional object which is to be or has been produced generatively in the course of carrying out a generative construction process.

The apparatus conveniently comprises a control device which is configured for driving the device in targeted manner, i.e. in particular for driving individual, a plurality of or all of the laser diode elements in targeted manner for respectively generating a laser beam with specific beam characteristics. The control device, implemented in hardware and/or software, may accordingly generate corresponding items of control information, on the basis of which individual, a plurality of or all of the laser diode elements are driven in targeted manner for respectively generating a laser beam with specific beam characteristics. As mentioned, individual, a plurality of or all of the laser diode elements may be variable in at least one parameter relating to the beam characteristics of the respective laser beam generable thereby, in particular in the input and/or output power thereof. In particular, it is possible for individual, a plurality of or all of the laser diode elements to be "dimmable" in a similar manner to a dimmable LED. Correspondingly, laser beams with different beam characteristics, i.e. for example a different energy density, intensity etc., may be generated by means of a laser diode element variable in at least one parameter relating to the beam characteristics, for example by varying the input and/or output power.

The control device is conveniently configured for driving individual, a plurality of or all of the laser diode elements in targeted manner for respectively generating a laser beam with specific beam characteristics on the basis of the or of at least one object-related object parameter simulated by the simulation device. When correspondingly driven by the control device, the device may accordingly be configured to adjust at least one corresponding object-related object parameter to a specific value or maintain it at a specific value by correspondingly driving individual, a plurality of or all of the laser diode elements for respectively generating a laser beam with specific beam characteristics. For example, when correspondingly driven by the control device, the device may be configured to produce and/or maintain a specific heat flow through the object which is to be or has been produced generatively or to produce and/or maintain a specific temperature (distribution) in the object which is to be or has been produced generatively by correspondingly driving individual, a plurality of or all of the laser diode elements for respectively generating a laser beam with specific beam characteristics (in the course of carrying out the generative construction process). In other words it is possible to simulate the object in advance and for example individually control the power of the individual diodes in accordance with the heat flow. In this manner, the structural characteristics of the object which is to be or has been produced can be positively influenced in targeted manner.

The invention furthermore relates to a method for the generative production of at least one three-dimensional object by successive, selective layer-by-layer solidification of individual construction material layers of a solidifiable construction material by means of at least one laser beam. The method may be a selective laser melting (SLM) method or a selective laser sintering (SLS) method. The method is distinguished in that an apparatus as described is used for the generative production of at least one three-dimensional object. All the explanations in connection with the apparatus therefore apply similarly to the method.

The invention is explained in greater detail on the basis of exemplary embodiments in the drawings, in which:

FIGS. 1-12 each show a schematic diagram of an apparatus for the generative production of a three-dimensional object according to an exemplary embodiment.

FIG. 1 shows a schematic diagram of an apparatus 1 according to an exemplary embodiment. The apparatus 1 serves for the generative production of a three-dimensional object 2, i.e. for example an industrial component or an industrial component assembly, by successive, selective layer-by-layer solidification of construction material layers of a solidifiable construction material 3 by means of at least one laser beam 5 generated by a device 4 (laser beam generation device).

The solidifiable construction material 3 may be a metal powder (mixture), i.e. for example an aluminum powder, and/or a plastics powder (mixture), i.e. for example a polyetherether ketone powder, and/or a ceramic powder (mixture), i.e. for example an alumina powder.

Respective construction material layers to be solidified are formed by means of a coater device 7 which is supported movably, as indicated by the horizontally oriented double-headed arrow 6, in a construction chamber 8 of the apparatus 1. A protective gas atmosphere, i.e. for example an argon or nitrogen atmosphere, typically prevails in the construction chamber 8. The successive, selective layer-by-layer solidification of respective construction material layers to be solidified proceeds in that laser beams 5 generated by the device 4 are selectively directed onto specific regions to be solidified of construction material layers corresponding to respective layer-related cross-sectional geometries of the object to be produced 2.

For generating laser beams 5, the device 4 comprises a plurality of laser diode elements 10, each of which is configured to generate a laser beam 5 directed directly onto the construction plane 9. Laser beams 5 generated by means of the device 4 typically impinge on the construction plane 9 at an angle of 90° relative to the plane of the construction plane. In this respect, the device 4 may be denoted or considered a "diode laser" since it comprises laser diode elements 10 for generating laser beams 5 or laser radiation. The laser diode elements 10 belonging to the device 4 may for example generate emitted laser powers in the range between 0.1 and 10 watts.

The device 4 is arranged directly in the construction chamber 8. The laser diode elements 10 are arranged directly above the construction plane 9; no further component, in particular no optical mask component, is located between the laser diode elements 10 and the construction plane 9. Accordingly, the laser beams 5 generable or generated by means of the laser diode elements 10 are directed directly onto the construction plane 9 and impinge directly on the construction plane 9. The laser beams 5 generable or generated by means of the laser diode elements 10 need not be deflected by means of a beam deflection device.

In the exemplary embodiment shown in FIG. 1, the laser diode elements 10 are arranged in a matrix arrangement ("matrix"). This should be taken to mean an arrangement of the laser diode elements 10 in a plurality of parallel rows and columns. The matrix accordingly comprises a plurality of rows, arranged in parallel, of a plurality of laser diode elements 10 and a plurality of columns, arranged in parallel, of a plurality of laser diode elements 10. The rows and columns lie in a plane which lies parallel to the construction plane 9. The columns extend at an angle, in particular perpendicular, to the rows and vice versa. The matrix arrangement of laser diode elements 10 corresponds to a pixel grid, as is for example provided in liquid crystal display devices ("LCD displays"); the individual laser diode elements 10 here correspond to the pixels of corresponding liquid crystal display devices.

The matrix arrangement of the laser diode elements 10 extends above the construction plane 9 over the entire area of the latter. The laser diode elements 10 are accordingly located directly opposite the total area/surface of the construction plane 9 and completely cover the area of the construction plane 9. Since the laser diode elements 10 completely cover the area of the construction plane 9, any part of the total area/surface of the construction plane 9 may, in principle, be selectively exposed as required without moving the device 4 relative to the construction plane 9. Selective exposure of the construction plane 9 proceeds by targeted driving of individual, a plurality of or all of the laser diode elements 10 for respectively generating a laser beam 5 with specific beam characteristics. A control device 11 coupled with the device 4 is provided for this purpose, which control device may be arranged within or, as shown by broken lines, outside the construction chamber 8.

The laser diode elements 10 are, in accordance with the principle of a liquid crystal display device, in principle drivable, i.e. in particular activatable and/or deactivatable, individually, in groups or as a whole for respectively generating a laser beam 5 with specific beam characteristics. Activation or deactivation of a laser diode element 10 may be taken to mean energizing the laser diode element 10; in an activated state, the laser diode element 10 is energized and generates a laser beam 5 and, in a deactivated state, is not energized and does not generate a laser beam 5. Activation or deactivation of a laser diode element 10 may also be taken to mean that the laser beam 5 generable or generated by means of the laser diode element 10 is directed in an activated state of the laser diode element 10 onto the construction plane 9 for example by moving, in particular pivoting, the laser diode element 10, and, in a deactivated state of the laser diode element 10, is directed away from the construction plane 9.

As is apparent from the following, the laser diode elements 10 are arrangeable or arranged as required in predeterminable or predetermined arrangement positions in a mounting device 12. The mounting device 12 is arranged within the construction chamber 8. In the exemplary embodiment shown in FIG. 1, the mounting device 12 is fastened to a wall of the construction chamber 8 and is not movable relative to the construction plane 9. The laser diode elements 10 arranged in the mounting device 12 are arranged in a defined position relative to, i.e. in particular at a defined distance from, the construction plane 9.

Figure 2:
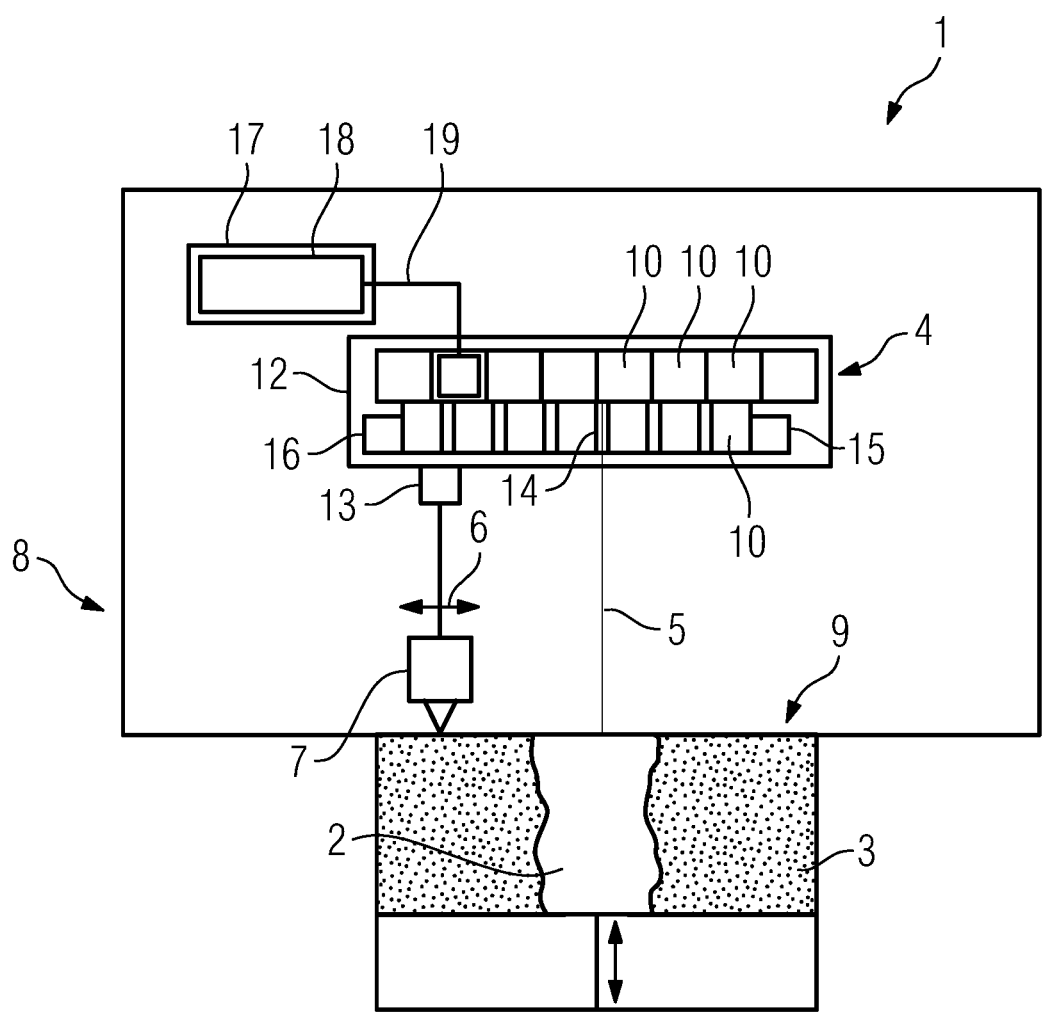

FIG. 2 shows a schematic diagram of an apparatus 1 according to a further exemplary embodiment.

A first difference from the exemplary embodiment shown in FIG. 1 is that the laser diode elements 10 are here arranged one above the other in a plurality of planes lying parallel to the construction plane 9. Arranging laser diode elements 10 in a plurality of planes one above the other gives rise to a particularly compact arrangement of the laser diode elements 10. The arrangement of the laser diode elements 10 in a plurality of planes one above the other is selected such that the laser beams 5 generable by means of the respective laser diode elements 10 may in each case be directed directly onto the construction plane 9. The laser diode elements 10 arranged in respective planes lying one above the other are arranged in a specific spatial offset relative to one another. A laser beam 5 generated by a laser diode element 10 arranged in the upper plane thus does not impinge on a laser diode element 10 arranged in the lower plane, but instead passes through a space 14, for example in the form of a slot, a bore or other opening, between laser diode elements 10 directly adjacently arranged in the lower plane onto the construction plane 9.

A further difference from the exemplary embodiment shown in FIG. 1 is that the coater device 7 is arranged on the mounting device 12. The coater device 7 is here arranged on the mounting device 12 with one degree of freedom of movement (cf. double-headed arrow 6) relative to the mounting device 12. A drive or guidance device 13, in particular (electric) motor-powered, coupled with the coater device 7 is provided for moving the coater device 7 relative to the mounting device 12. It is possible to carry out coating operations and exposure operations simultaneously; of course, in this case only those parts of the construction plane 9 in which a construction material layer has already been formed by the coater device 7 are exposed.

A further difference from the exemplary embodiment shown in FIG. 1 is that the apparatus 1 comprises an evaluation device 16 for evaluating, in particular optically, the surface quality of a construction material layer which is to be solidified and/or has solidified. The evaluation device 16 may take the form of a camera or comprise one such. The evaluation device 16 is likewise arranged on the mounting device 12. The evaluation device 16 may likewise be arranged on the mounting device 12 in at least one degree of freedom of movement relative to the mounting device 12. A drive and/or guidance device (not shown), in particular (electric) motor-powered, coupled with the evaluation device 16 may be provided for moving the evaluation device 16 relative to the mounting device 12. It is possible to carry out coating operations, exposure operations and evaluation operations simultaneously; of course, in this case only those parts of the construction plane 9 in which a construction material layer has already been formed by the coater device 7 and exposed are evaluated.

A further difference from the exemplary embodiment shown in FIG. 1 is that the apparatus 1 comprises a detection device 15 for detecting the temperature of a construction material layer which is to be solidified and/or has already solidified. The detection device 15 may take the form of a pyrometer or comprise at least one such. The temperature values detected by means of the detection device 15 may be used as the basis for a thermal pretreatment of a construction material layer to be solidified or a thermal posttreatment of an already solidified construction material layer. The detection device 15 is likewise arranged on the mounting device 12. The detection device 15 may likewise be arranged on the mounting device 12 in at least one degree of freedom of movement relative to the mounting device 12. A drive and/or guidance device (not shown), in particular (electric) motor-powered, coupled with the detection device 15 may be provided for moving the detection device 15 relative to the mounting device 12. It is possible to carry out temperature detection operations and exposure operations simultaneously. The exposure parameters can be adjusted by means of the control device 11 as a function of the detected temperature.

The laser diode elements 10 are detachably connected to the mounting device 12. The detachable connection of the laser diode elements 10 to the mounting device 10 is convenient in the event of a defect in a laser diode element 10, since the defective laser diode element 10 can straightforwardly be removed from the mounting device 12 and replaced. The apparatus 1 may comprise a detection device 17 for detecting a defective laser diode element 10, which device, on detecting a defective laser diode element 10, for example acoustically and/or optically outputs an item of information relating to a defective laser diode element 10. The item of information may contain details about technical specifications, for example type, of the defective laser diode element 10, the precise nature of the defect, the arrangement or position of the defective laser diode element 10 on or in the mounting device 12, etc.

The apparatus 1 may furthermore comprise a replacement device 18 which interacts with the detection device 17 for partially or completely automatic replacement of defective laser diode elements 10. The replacement device 18 comprises a number of gripper elements 19 for gripping laser diode elements 10 in the course of replacement. The replacement device 18 may for example take the form of a single or multiple axis robot device or comprise at least one such.

Figure 3:
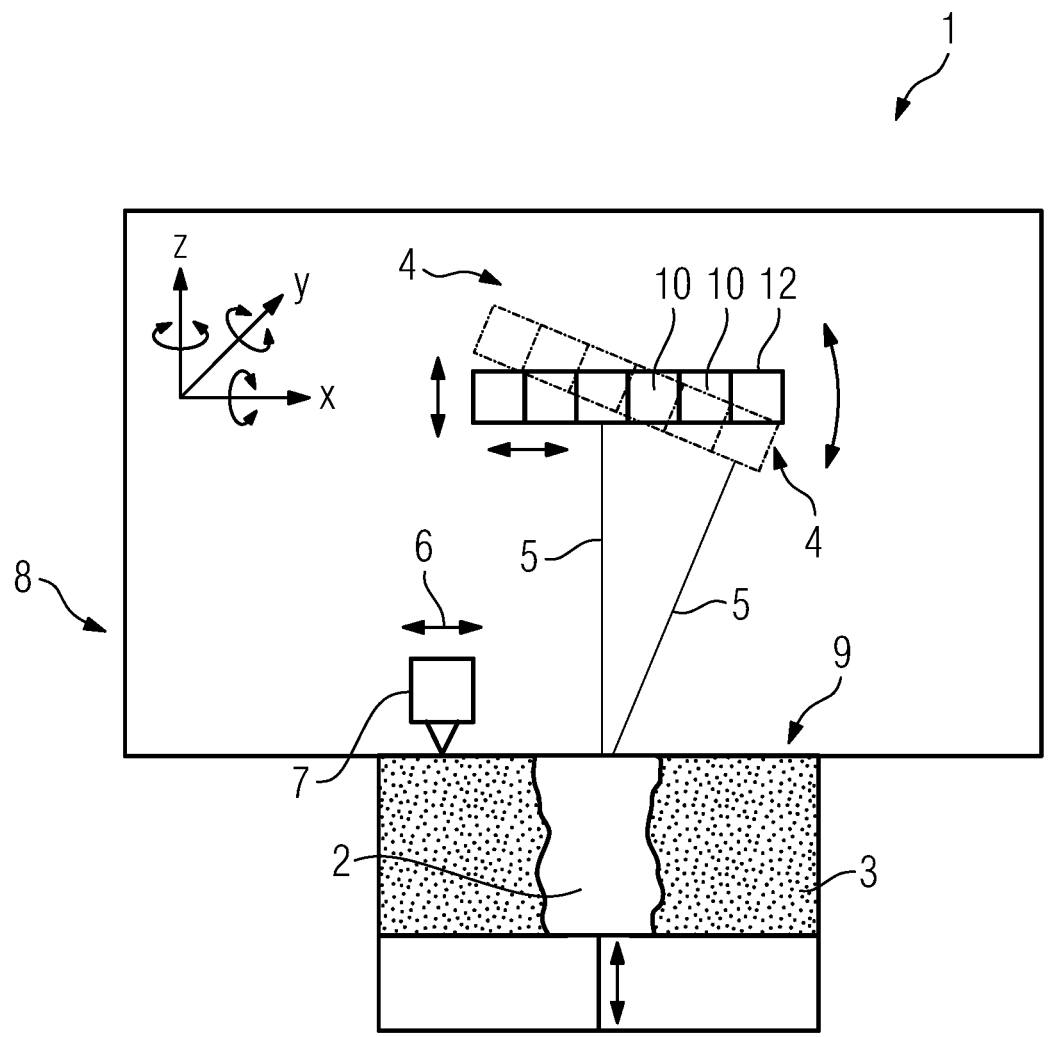
Figure 4:
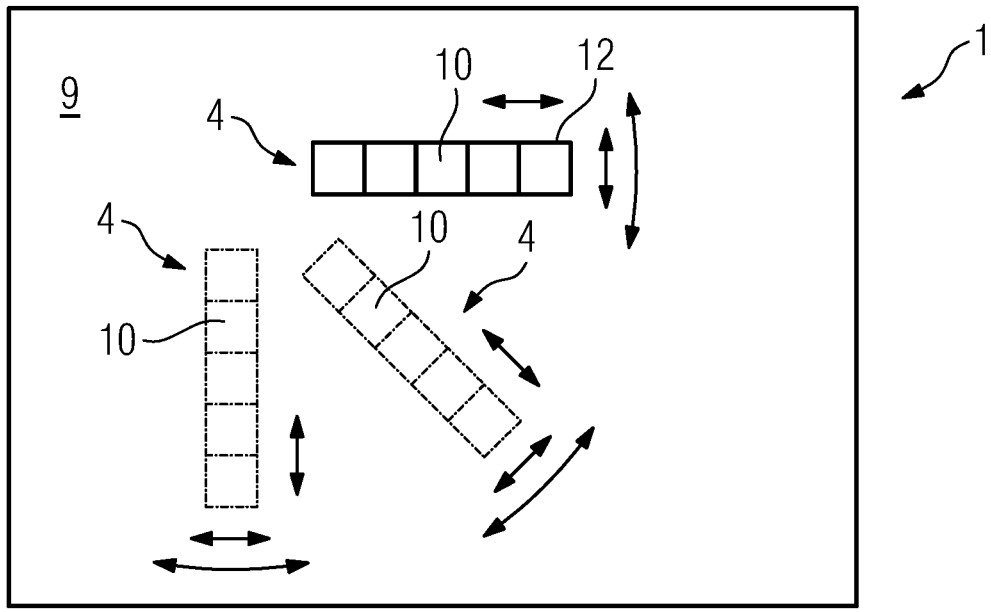

FIGS. 3 and 4 each show a schematic diagram of an apparatus 1 according to a further exemplary embodiment. FIG. 3 shows the entire apparatus 1, while FIG. 4 shows a plan view onto the construction plane 9 as a portion of the apparatus 1.

In the exemplary embodiment shown in FIGS. 3 and 4, the laser diode elements 10 are arranged in rows or columns in a plane and cover only a part of the area of the construction plane 9. The laser diode elements 10 are accordingly located directly opposite at least a part, i.e. a partial area/surface of the total area/surface, of the construction plane 9. The part of the area of the construction plane 9 covered by means of corresponding laser diode elements 10 can be selectively exposed without necessarily requiring mechanical movement of the laser diode elements 10 relative to the construction plane 9.

In contrast with the exemplary embodiments shown in FIGS. 1 and 2, the mounting device 12 is movably supported in at least one degree of freedom of movement relative to the construction plane 9. Movement of the mounting device 12 proceeds by means of a(n electric) motor-powered drive or guidance device (not shown) coupled therewith. Movement of the mounting device 12 may include translational degrees of freedom of movement along at least one axis of translation and/or rotational degrees of freedom of movement about at least one axis of rotation (cf. arrows shown in FIGS. 3 and 4). The movement of the mounting device 12 may accordingly for example be a linear, rotary, tilt or pivot movement. FIG. 3 shows a tilted or pivoted position of the mounting device 12 in dash-dotted lines. Combined movements in a plurality of different degrees of freedom of movement are possible. Respective degrees of freedom of movement, in which the mounting device 12 can be movably supported, are indicated by the coordinate system diagram shown; the mounting device 12 may in particular be movably supported in the axes of translation and/or rotation defined by the x, y and z axes.

Movement of the mounting device 12 may proceed simultaneously with the exposure of the construction plane 9 by the laser diode elements 10. In connection with the exposure of the construction plane 9, the mounting device 12 may also be moved in different degrees of freedom of movement or in different trajectories relative to the construction plane 9 (cf. FIG. 4). In this manner, different solidification structures, i.e. for example weld seams, may be formed in the construction material layer to be solidified and internal stresses arising during processing in the object 2 to be produced may be reduced, which has a positive impact on the quality of the object 2 to be produced.

In the exemplary embodiment shown in FIGS. 3 and 4 with a mounting device 12 with laser diode elements 10 arranged in rows or columns thereon or therein, the mounting device 12 may initially be moved over the construction plane 9 for example along a first trajectory defined by a first, for example linear, movement axis and subsequently over the construction plane 9 along a further trajectory defined by a further, for example linear, movement axis (cf. the mounting device 12 shown in dash-dotted lines in FIG. 4). The further trajectory may extend for example at an angle, in particular orthogonally, to the first trajectory (cf. FIG. 4).

Figure 5:
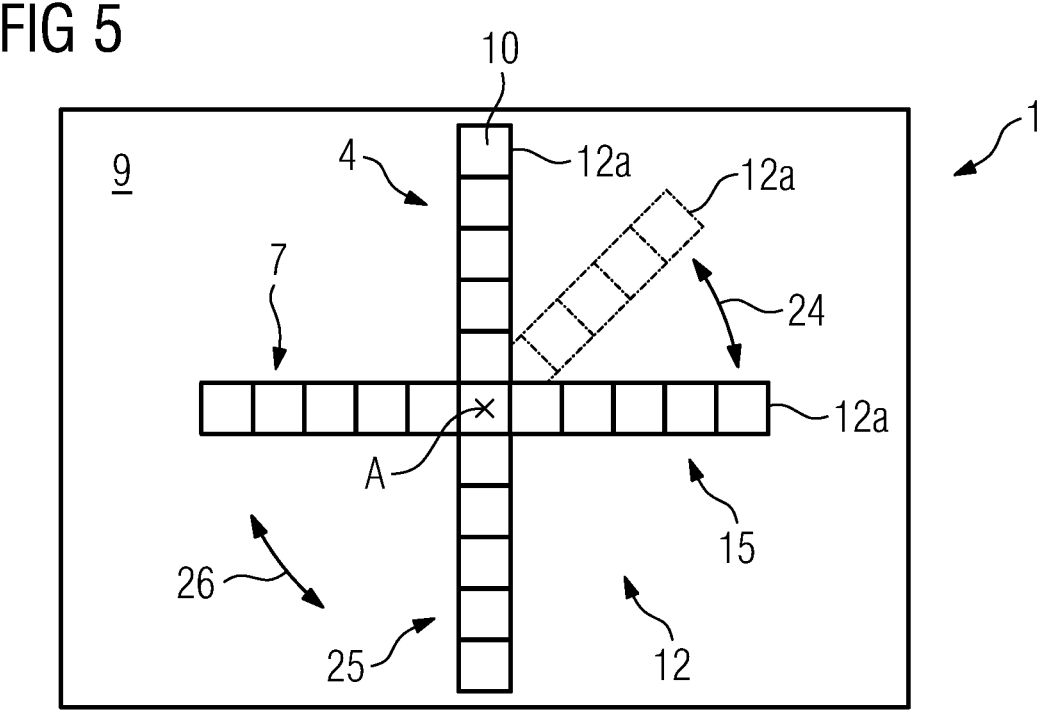
Figure 6:
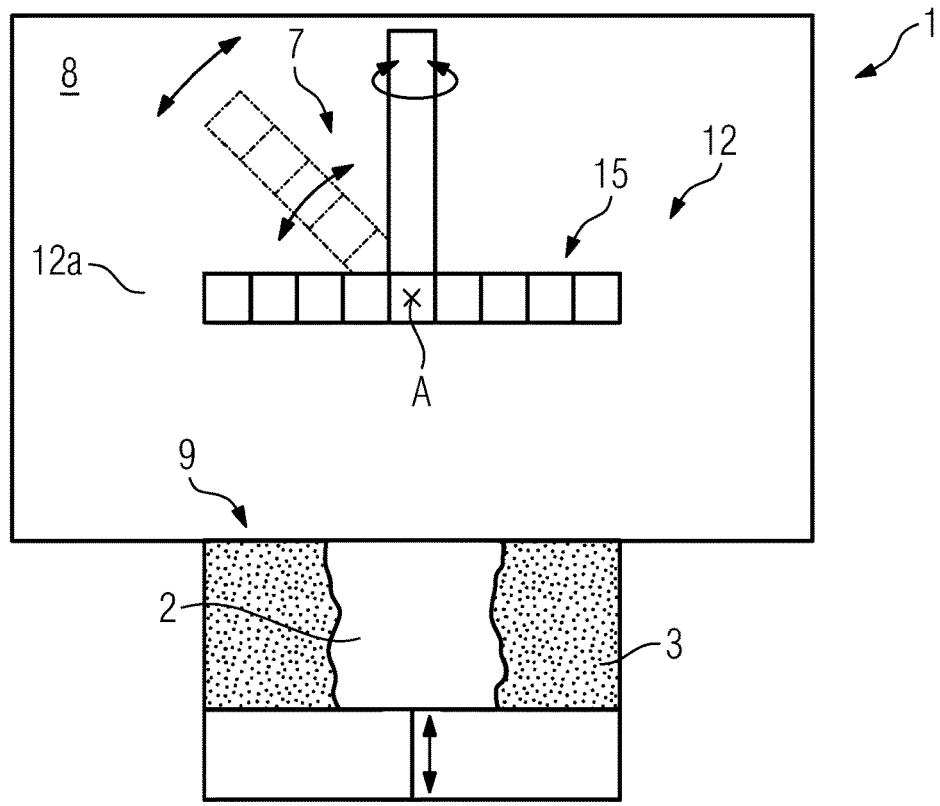

FIGS. 5 and 6 show a schematic diagram of an apparatus 1 according to a further exemplary embodiment. FIG. 5 shows a plan view onto the construction plane 9 as a portion of the apparatus 1, while FIG. 6 shows a side view of the mounting device 12 as a portion of the apparatus 1.

The mounting device 12 here comprises a plurality of mounting device segments 12*a*, wherein at least two mounting device segments 12*a* are arranged movably in at least one degree of freedom of movement relative to the construction plane 9 and in at least one degree of freedom of movement relative to one another. Movement of the mounting device segments 12*a* may include translational degrees of freedom of movement along at least one axis of translation and/or rotational degrees of freedom of movement about at least one axis of rotation. FIG. 5 shows, in dash-dotted lines, a mounting device segment 12*a* pivotable counterclockwise relative to a further mounting device segment 12*a*. The pivot movement indicated by the arrow 24 proceeds in a plane lying parallel to the construction plane 9. A coater device 7 may, for example, be arranged on the pivotable mounting device segment 12*a*. FIG. 6 shows, in dash-dotted lines, a pivot movement of a mounting device segment 12*a* relative to the construction plane 9. A coater device 7 may, for example, in turn be arranged on the pivotable mounting device segment 12*a*.

The mounting device segments 12*a* may be provided with different functions. A number of laser diode elements 10, for example arranged in rows and/or columns, are typically arranged on at least one first mounting device segment 12*a* for exposure of a construction material layer to be solidified. A further number of laser diode elements 10 for thermal pretreatment of a construction material layer to be solidified and/or for thermal posttreatment of an already solidified construction material layer may be arranged on further mounting device segments 12*a*. Alternatively or in addition, further functional components of the apparatus 1 may be arranged on further mounting device segments 12*a*. Such further functional components may for example be an application or dispensing device 25 for applying a specific quantity of construction material 3 onto a construction plane 9, a coater device 7 for forming a construction material layer to be solidified, an evaluation device 16 for evaluating, in particular optically, the surface quality of a construction material layer which is to be solidified and/or has solidified or a detection device 15 for detecting the temperature of a construction material layer which is to be solidified or has already solidified, etc.

The mounting device 12 shown in FIGS. 5 and 6 comprises four mounting device segments 12*a* arranged in a cross, which are movable individually, in groups or as a whole relative to the construction plane 9 and/or individually or in groups relative to one another. An application or dispensing device 25 is arranged on a first mounting device segment 12*a*, a coater device 7 on a second mounting device segment 12*a*, a number of laser diode elements 10 for exposure of a construction material layer to be solidified on a third mounting device segment 12*a* and a detection device 15 for detecting the temperature of a solidified construction material layer on a fourth mounting device segment 12*a*.

Figure 7:
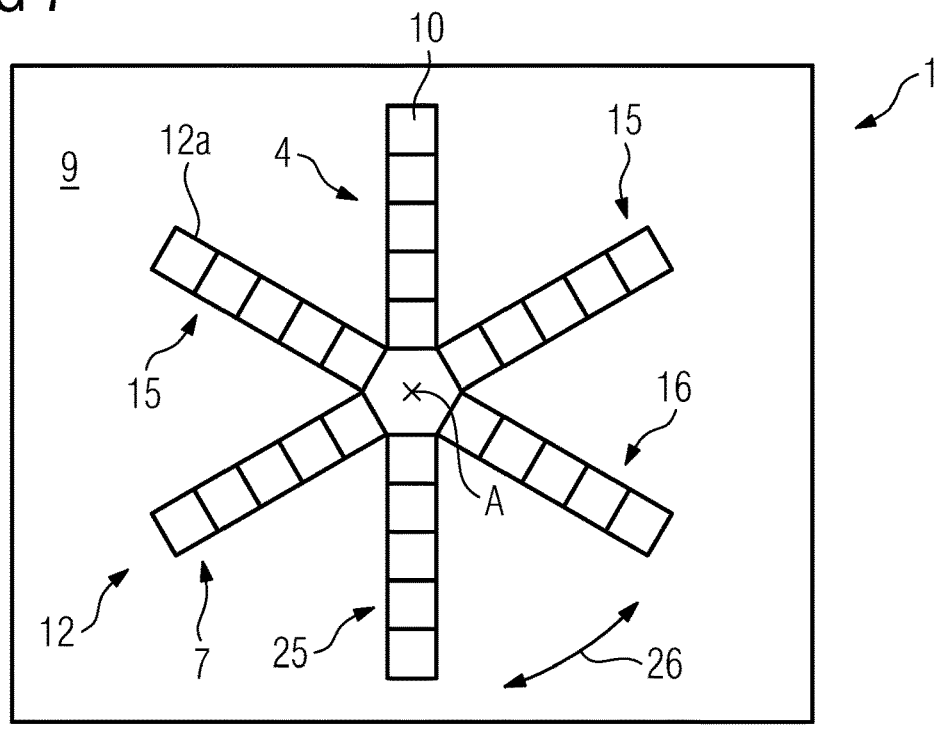

FIG. 7 shows a schematic diagram of an apparatus 1 according to a further exemplary embodiment. FIG. 7 shows a plan view onto the construction plane 9 as a portion of the apparatus 1.

The mounting device 12 shown in FIG. 7 comprises six mounting device segments 12*a* arranged in a cross, which are movable individually, in groups or as a whole relative to the construction plane 9 and/or individually or in groups relative to one another. An application or dispensing device 25 is arranged on a first mounting device segment 12a, a coater device 7 on a second mounting device segment 12a, a detection device 15 for detecting the temperature of a construction material layer to be solidified on a third mounting device segment 12a, a number of laser diode elements 10 for exposure of a construction material layer to be solidified on a fourth mounting device segment 12a, a detection device 15 for detecting the temperature of a solidified construction material layer on a fifth mounting device segment 12a and an evaluation device 16 for evaluating, in particular optically, the surface quality of a solidified construction material layer on a sixth mounting device segment 12a.

In principle, movement of mounting device segments 12a in at least one degree of freedom of movement relative to the construction plane 9 and/or in at least one degree of freedom of movement relative to one another may proceed alternatively or in addition to a movement of the entire mounting device 12 relative to the construction plane 9. The optional additional movement of the entire mounting device 12 relative to the construction plane 9 is indicated in FIGS. 5 and 7 by the arrow 26.

Figure 8:
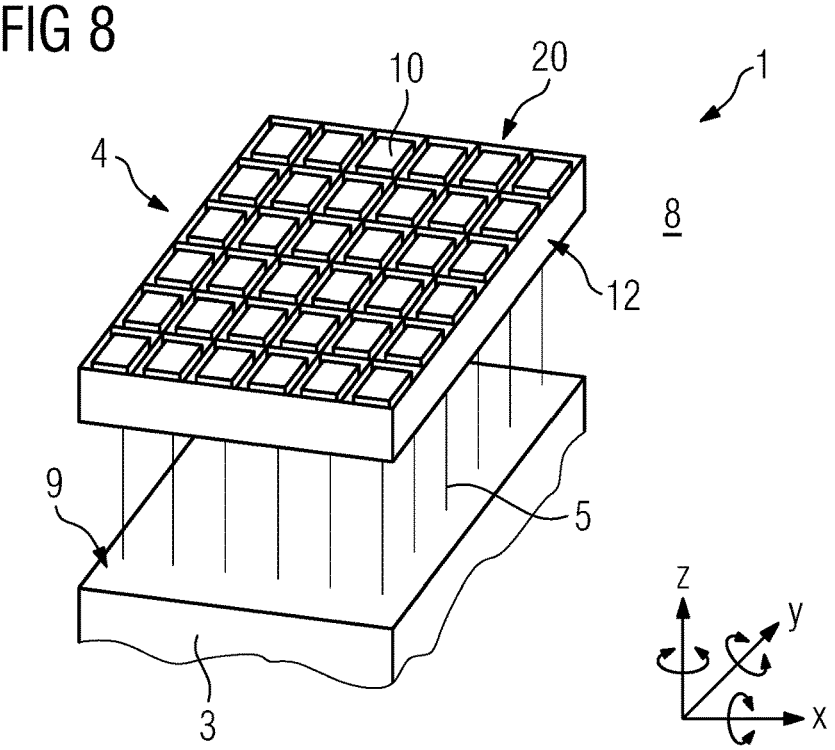

FIG. 8 shows a schematic diagram of an apparatus 1 according to a further exemplary embodiment. FIG. 8 shows a perspective view of the device 4 and the construction plane 9 as a portion of the apparatus 1.

The predeterminable or predetermined arrangement positions of laser diode elements 10 on or in the mounting device 12 are apparent from FIG. 8. The arrangement positions of laser diode elements 10 are distributed in FIG. 8 by way of example in a grid such that a matrix arrangement of laser diode elements 10 is possible.

The arrangement positions are typically defined by receiving means 20 on the mounting device for receiving at least one laser diode element 10. The number of receiving means 20 corresponds at least to the number of laser diode elements 10. The receiving means may comprise 20 connection elements (not shown) which interact with corresponding mating connection elements (not shown) arranged or formed on the laser diode elements 10 to form a (positionally) stable connection of the laser diode elements 10 to the mounting device 12. By means of the interaction of corresponding connection elements and corresponding mating connection elements, a form- and/or force-locking connection can be produced; the connection elements may for example take the form of form- and/or force-locking elements, i.e. for example insertion elements, such as insertion pins or insertion receptacles corresponding thereto, and/or latching/snap-fit elements, such as latching/snap-fit projections or recesses corresponding thereto, and/or screw/threaded elements, such as bolts or stud bolts or screw or threaded receptacles corresponding thereto, etc. The mating connection elements may for this purpose take the form of corresponding form- and/or force-locking elements. Laser diode elements 10 may, of course, also be bonded, i.e. for example adhesively bonded, to the mounting device 12.

It is furthermore apparent from FIG. 8 that laser diode elements 10 may also be arrangeable or arranged movably on or in the mounting device 12 in at least one degree of freedom of movement relative to the mounting device 12 and thus also relative to the construction plane 9. By moving individual, a plurality of or all of the laser diode elements 10 relative to the mounting device 12, it is for example possible to move the laser diode elements 10 relative to the construction plane 9 with regard to a specific exposure situation. It is likewise possible to move, i.e. in particular to tilt or pivot, laser diode elements 10 in a deactivated state in which a respective generable or generated laser beam 5 is directed away from the construction plane 9. Movement of the laser diode elements 10 proceeds by means of a(n electric) motor-powered drive or guidance device (not shown) coupled therewith. Movement of a laser diode element 10 may include translational degrees of freedom of movement along at least one axis of translation and/or rotational degrees of freedom of movement about at least one axis of rotation. The movement of a laser diode element 10 may accordingly for example be a linear, rotary, tilt or pivot movement. Combined movements in a plurality of different degrees of freedom of movement are possible. Respective degrees of freedom of movement, in which the laser diode elements 10 can be movably supported, are also indicated by the coordinate system diagram shown in FIG. 8; the laser diode elements 10 may in particular be movably supported in the axes of translation and rotation defined by the x, y and z axes.

Movement of the laser diode elements 10 may also proceed simultaneously with the exposure of the construction plane 9 by the laser diode elements 10. Individual, a plurality of or all of the laser diode elements 10 may also be moved in connection with the exposure of the construction plane 9 in different degrees of freedom of movement or in different trajectories relative to the construction plane 9. In this manner also, different solidification structures, as mentioned for example weld seams, may be formed in the construction material layer to be solidified and internal stresses arising during processing in the object 2 to be produced may be reduced, which has a positive impact on the quality of the object 2 to be produced. Individual, a plurality of or all of the laser diode elements 10 may initially be moved over the construction plane 9 for example along a first trajectory defined by a first, for example linear, movement axis and subsequently over the construction plane 9 along a further trajectory defined by a further, for example linear, movement axis. The further trajectory may here too extend for example at an angle, in particular orthogonally, to the first trajectory.

Figure 9:
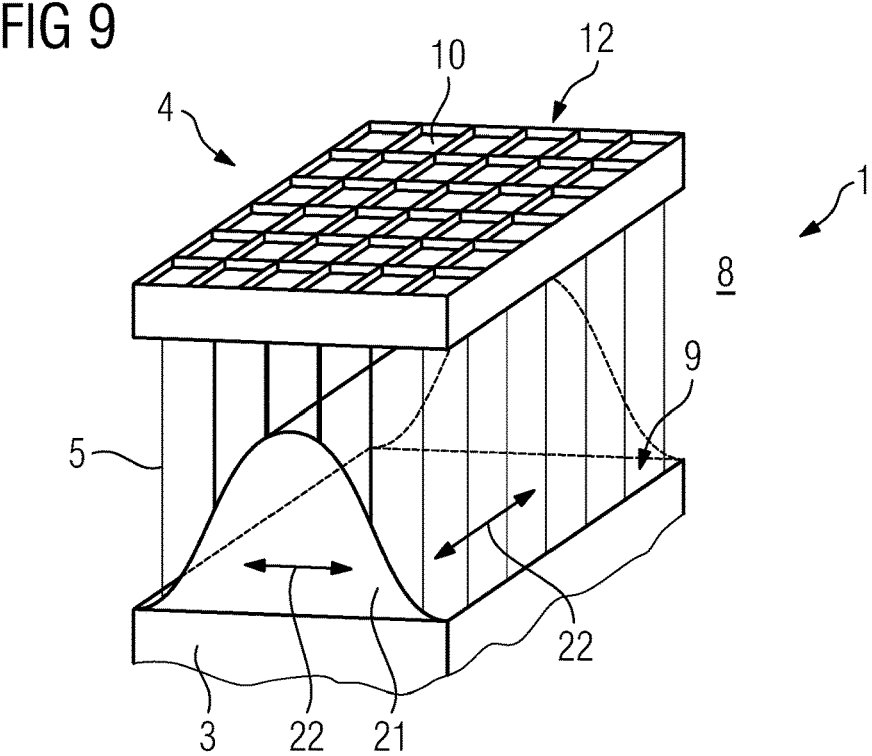
Figure 10:
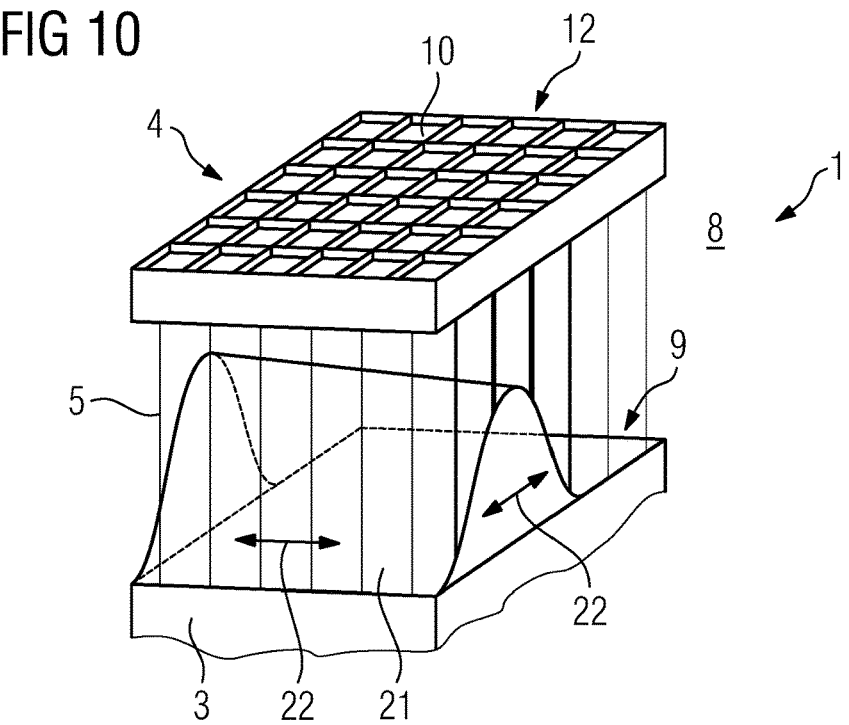

FIGS. 9 and 10 each show a schematic diagram of an apparatus 1 according to a further exemplary embodiment. FIGS. 9 and 10 in each case show a perspective view of the device 4 and the construction plane 9 as a portion of the apparatus 1.

It should be explained in connection with the exemplary embodiment shown in FIGS. 9 and 10 that individual, a plurality of or all of the laser diode elements 10 may be variable in at least one parameter relating to the beam characteristics of the laser beam 5 generable thereby, in particular in the input and/or output power thereof. Individual, a plurality of or all of the laser diode elements 10 may be "dimmable" in a similar manner to a dimmable LED. Correspondingly, laser beams 5 with different beam characteristics, i.e. for example a different energy density, intensity etc., may be generated by means of the laser diode elements 10 variable in at least one parameter relating to the beam characteristics, for example by varying the input and/or output power. Specific overall beam energy profiles 21 may accordingly be formed when a plurality of laser beams 5 are generated simultaneously. The laser diode elements 10 may be driven or varied in the output power thereof in such a manner that an overall beam energy profile 21 with a specific two- or three-dimensional geometric shape is obtained; for the Gaussian overall beam energy profile 21 shown by way of example in FIGS. 9 and 10, laser diode elements 10 arranged centrally with regard to the overall beam energy profile 21 are operated at a higher power in comparison with laser diode elements 10 arranged peripherally with regard to the overall beam energy profile 21. It is apparent from FIGS. 9 and 10 that overall beam energy profiles 21 may be generated in different orientations relative to the construction plane 9.

As indicated by the arrows 22, the laser diode elements 10 may furthermore be driven or varied in the output power thereof in such a manner that an overall beam energy profile 21 which corresponds to a wavefront and which is movable or moving, optionally to and fro, along the construction plane 9 and is thus dynamic is obtained. The laser diode elements 10 are driven for this purpose in a similar manner to an LED display for the moving display of alphanumeric symbols which comprises a plurality of LEDs. The laser diode elements 10 correspond to the LEDs belonging to the LED display.

In connection with the exemplary embodiment shown in FIGS. 9 and 10, but not limited thereto, it should be noted that individual, a plurality of or all of the laser diode elements 10 may in general vary in at least one parameter relating to the beam characteristics of the respective laser beam 5 generable thereby. The formation of specific two- or three-dimensional overall beam energy profiles having cross-sectional profiles which are identical, similar or different at least in portions may accordingly also be achieved by laser diode elements 10 which differ in at least one parameter relating to the beam characteristics of the respective laser beam 5 generable thereby, i.e. for example in the input and/or output power thereof.

It is apparent from the exemplary embodiment shown in FIGS. 9 and 10 that immobile or moving overall beam energy profiles 21 having cross-sectional profiles which are identical, similar or different at least in portions, or in general overall beam energy profiles 21 of any desired two- or three-dimensional geometric shape may be achieved.

Figure 11:
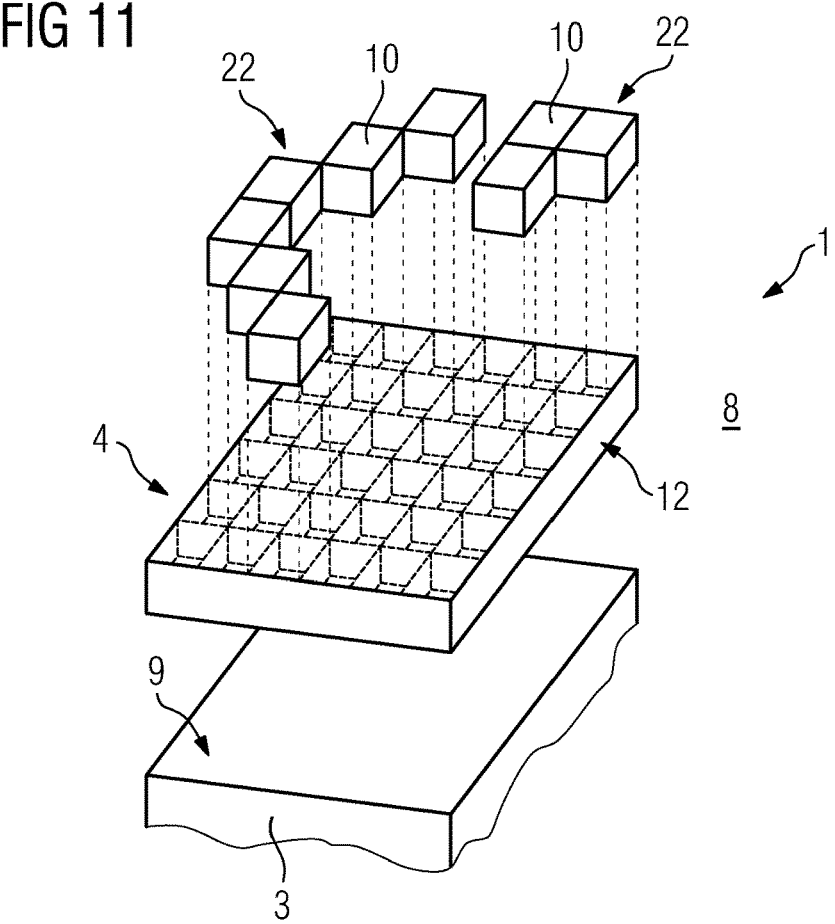

FIG. 11 shows a schematic diagram of the apparatus 1 according to a further exemplary embodiment. FIG. 11 shows a perspective view of the device 4 and the construction plane 9 as a portion of the apparatus 1.

It is apparent from FIG. 11 that, by arranging laser diode elements 10 as required at predeterminable or predetermined arrangement positions of the mounting device 12, it is possible for laser diode elements 10 to be arrangeable or arranged, with regard to an optionally cross-sectional, outer and/or inner contour of an object 2 to be produced, in groups 22 preconfigured in a specific spatial arrangement relative to one another as required at predeterminable or predetermined arrangement positions of the mounting device 12. It is thus possible in connection with the generative production of an object 2 with a specific outer and/or inner contour to prepare at least one preconfigured group 22 of laser diode elements 10 formed of laser diode elements 10 arranged in a specific spatial arrangement relative to one another, to connect said preconfigured group to the mounting device 12, as indicated by the arrow 23, i.e. for example to insert it into the mounting device 12, for carrying out generative production of the object 2, and, once the object 2 has been produced, to remove it from the mounting device 12 or, for subsequent production of another object 2 with a different outer and/or inner contour, to replace it with another group 22 of laser diode elements 10 preconfigured, with regard to the outer and/or inner contour of the other object 2, in a specific spatial arrangement relative to one another.

Respective preconfigured groups 22 of laser diode elements 10 are thus in principle associable or associated with an object 2 with a specific geometric shape, i.e. in particular with a specific outer and/or inner contour. Respective preconfigured groups 22 of laser diode elements 10 may be kept in (intermediate) storage in a store while retaining the arrangement of the laser diode elements 10 and used as often as desired for the generative production of said respectively associated objects 2. It is, of course, also possible to reconfigure a preconfigured group 22 of laser diode elements 10 with regard to the geometric shape of another object 2 by rearranging individual, a plurality of or all of the laser diode elements 10 in a similar manner to a typecase ("typecase principle").

Since a plurality of objects 2 of a geometrically different shape may be produced in a generative construction operation, a plurality of differently preconfigured groups 22 of laser diode elements 10 may, of course, also be present. The exemplary embodiment shown in FIG. 11 accordingly shows examples of differently preconfigured groups 22 of laser diode elements 10. A first example group 22 of laser diode elements 10 arranged in a crescent shape serves to produce a crescent-shaped object 2, while a further example group 22 of laser diode elements 10 arranged in an L shape serves to produce an L-shaped object 2.

FIG. 12 shows a schematic diagram of an apparatus 1 according to a further exemplary embodiment.

In contrast with the exemplary embodiments shown in FIGS. 1-11, the laser diode elements 10 belonging to the device 4 are arranged outside the construction chamber 8. The device 4 comprises a number of optical elements 27 arranged within the construction chamber 8 directly above the construction plane 9. The optical elements 27 are configured for deflecting a laser beam 5 generated by at least one laser diode element 10 directly onto the construction plane 9. For this purpose, each optical element 27 is optically coupled via a light guide element 28, for example in the form of a glass fiber cable, with at least one laser diode element 10. An optical element 27 may take the form of or at least comprise a focusing optical system 29 comprising one or more optical lens elements for focusing a laser beam 5 onto the construction plane 9.

In the exemplary embodiment shown in FIG. 12, each optical element 27 is optically coupled with (precisely) one laser diode element 10. Alternatively, it is of course conceivable to couple at least one optical element 27 optically with a plurality of laser diode elements 10 or to couple at least one laser diode element 10 via suitable beam splitting elements (not shown) with a plurality of optical elements 27.

In a similar manner to the arrangement of the laser diode elements 10 in a mounting device 12 shown in FIGS. 1-11, the optical elements 27 are likewise arranged on or in a corresponding mounting device 12.

Since the essential difference between the exemplary embodiments shown in FIGS. 1-11 and the exemplary embodiment shown in FIG. 12 consists, according to FIG. 12, in optical elements 27 instead of laser diode elements 10 being arranged within the construction chamber 8, which optical elements are optically coupled with laser diode elements 10 arranged outside the construction chamber 8, all the explanations in connection with the exemplary embodiments shown in FIGS. 1-11 apply mutatis mutandis; the laser diode elements 10 arranged within the construction chamber 8 according to the exemplary embodiments shown in FIGS. 1-11 need merely be imagined to be replaced by optical elements 27 optically coupled with laser diode elements 10 arranged outside the construction chamber 8 according to the exemplary embodiment shown in FIG. 12.

It is the case for all the exemplary embodiments that, by means of laser beams 5 generable by means of different laser diode elements 10, it is possible to achieve different functions, i.e. in particular thermal pretreatment of construction material layers to be solidified and/or a thermal posttreatment of already solidified construction material layers. For example, at least one first laser diode element 10 or a group of first laser diode elements 10 may be configured to generate a laser beam 5 for solidifying construction material layers to be solidified and at least one further laser diode element 10 or a group of further laser diode elements 10 may be configured to generate a laser beam 5 for the thermal pretreatment of construction material layers to be solidified and/or to generate a laser beam 5 for the thermal posttreatment of already solidified construction material layers. A laser beam 5 generated for solidifying construction material layers typically has a higher energy (density) than a laser beam 5 generated for the thermal pre- or posttreatment of construction material layers which are to be solidified or are already solidified.

Although not shown in the figures, apparatus 1 may comprise a simulation device implemented in hardware and/or software which is configured for simulating at least one object-related object parameter, which is modifiable in the course of carrying out a generative construction process, of the object 2 which is to be or has been produced. On the basis of or taking account of various items of information of relevance to the particular object parameter to be simulated, such as for example information about the construction material 3 used in the course of carrying out the generative construction process, information about various characteristics, for example density, geometry, etc., of the object 2 which is to be or has been produced, etc., the simulation device can simulate at least one object-related object parameter which is modifiable with the apparatus 1 in the course of carrying out a generative construction process. The simulation device is provided for this purpose with suitable simulation algorithms. The simulation may proceed before and/or in the course of carrying out a generative construction process with the apparatus.

A corresponding object-related object parameter modifiable in the course of carrying out a generative construction process may be, for example, the heat flow through the object 2 which is to be or has been produced which arises in the course of carrying out a generative construction process and/or the temperature or the temperature distribution of the object 2 which is to be or has been produced. Alternatively or in addition, it is conceivable for the object-related object parameter to be mechanical loads, in particular stresses, which may arise in the three-dimensional object 2 which is to be or has been produced in the course of carrying out a generative construction process.

As mentioned, the apparatus 1 comprises a control device 11 which is configured for driving the device in targeted manner, i.e. in particular for driving individual, a plurality of or all of the laser diode elements in targeted manner for respectively generating a laser beam with specific beam characteristics. The control device 11 generates corresponding items of control information, on the basis of which individual, a plurality of or all of the laser diode elements 10 are driven in targeted manner for respectively generating a laser beam with specific beam characteristics. As mentioned, individual, a plurality of or all of the laser diode elements may be variable in at least one parameter relating to the beam characteristics of the respective laser beam generable thereby, in particular in the input and/or output power thereof. In particular, it is possible for individual, a plurality of or all of the laser diode elements to be "dimmable" in a similar manner to a dimmable LED. Correspondingly, laser beams with different beam characteristics, i.e. for example a different energy density, intensity etc., may be generated by means of a laser diode element variable in at least one parameter relating to the beam characteristics, for example by varying the input and/or output power.

The control device 11 may be configured for driving individual, a plurality of or all of the laser diode elements 10 in targeted manner for respectively generating a laser beam 5 with specific beam characteristics on the basis of the or of at least one object-related object parameter simulated by the simulation device. When correspondingly driven by the control device 11, the device 4 may accordingly be configured to adjust at least one corresponding object-related object parameter to a specific value or maintain it at a specific value by correspondingly driving individual, a plurality of or all of the laser diode elements 10 for respectively generating a laser beam 5 with specific beam characteristics. For example, when correspondingly driven by the control device 11, the device 4 may be configured to produce and/or maintain a specific heat flow through the object 2 which is to be or has been produced by correspondingly driving individual, a plurality of or all of the laser diode elements 10 for respectively generating a laser beam 5 with specific beam characteristics (in the course of carrying out the generative construction process).

By means of the apparatuses 1 shown in the figures, it is possible in each case to achieve a method for generative production of a three-dimensional object 2 by successive, selective layer-by-layer solidification of individual construction material layers of a solidifiable construction material 2 by means of at least one laser beam 5. The method may be a selective laser melting (SLM) method or a selective laser sintering (SLS) method.

LIST OF REFERENCE NUMERALS

1 Apparatus
2 Object
3 Construction material
4 Device
5 Laser beam
6 Double-headed arrow
7 Coater device
8 Construction chamber
9 Construction plane
10 Laser diode element
11 Control device
12 Mounting device
13 Drive and/or guidance device
14 Space
15 Detection device
16 Evaluation device
17 Detection device
18 Replacement device
19 Gripper element
20 Receiving means
21 Overall beam energy profile
22 Group
23 Arrow
24 Arrow
25 Application or dispensing device
26 Arrow
27 Optical element
28 Light guide element
29 Focusing optical system

The invention claimed is:

1. An apparatus for generative production of a three-dimensional object by successive, selective layer-by-layer solidification of construction material layers of a solidifiable construction material, the apparatus comprising:
    a device for selective layer-by-layer solidification of the construction material layers of the solidifiable construction material, wherein the device comprises:
        a mounting device, and a plurality of laser diode elements arranged in the mounting device, the mounting device disposed directly above a construction plane on which the construction material layers are selectively solidified, the plurality of laser diode elements arranged in a plurality of planes, the plurality of planes arranged one above another and in a specific spatial offset relative to one another, and
    wherein respective ones of the plurality of planes comprise a corresponding portion of the plurality of laser diode elements respectively arranged as a matrix comprising a plurality of contiguous rows and a plurality of contiguous columns, and wherein respective ones of the plurality of laser diode elements are respectively configured to generate a laser beam that impinges upon the construction plane, and
    wherein the plurality of planes arranged one above another comprises an upper plane and a lower plane, wherein the specific spatial offset provides the corresponding portion of the plurality of laser diode elements in the upper plane arrangement directly above the construction plane through alignment with a corresponding space defined between respective ones of the plurality of laser diode elements in the lower plane, and wherein the specific spatial offset allows laser beams emitted by the corresponding portion of the plurality of laser diode elements in the upper plane to respectively pass through the corresponding space defined between respective ones of the corresponding portion of the plurality of laser diode elements in the lower plane directly onto the construction plane.

2. The apparatus as claimed in claim 1, wherein respective ones of the plurality of contiguous columns extend orthogonally from corresponding ones of the plurality of contiguous rows.

3. The apparatus as claimed in claim 1, wherein the corresponding space defined between respective ones of the corresponding portion of the plurality of laser diode elements in the lower plane comprises: a slot, a bore, or an opening.

4. The apparatus as claimed in claim 1, wherein the plurality of laser diode elements are configured for arrangement with regard to an outer contour and/or an inner contour of the three-dimensional object to be produced.

5. The apparatus as claimed in claim 1, wherein a laser diode element of the plurality of laser diode elements is variable in a parameter relating to a beam characteristic of a respective laser beam generated by the laser diode element.

6. The apparatus as claimed in claim 1, wherein at least some of the plurality of laser diode elements are drivable individually, in groups or together for respectively generating a respective laser beam having specific beam characteristics.

7. The apparatus as claimed in claim 1, wherein a laser diode element of the plurality of laser diode elements generates a respective laser beam differing in at least one beam characteristic.

8. The apparatus as claimed in claim 1, wherein a first laser diode element of the plurality of laser diode elements is configured for generating a respective first laser beam for solidifying the construction material layers to be solidified, and
    a second laser diode element of the plurality of laser diode elements is configured for generating a respective second laser beam for a thermal pretreatment of the construction material layers to be solidified and/or for generating the respective second laser beam for a thermal posttreatment of already solidified construction material layers.

9. The apparatus as claimed in claim 1, wherein the plurality of laser diode elements are arrangeable or arranged, with regard to an outer contour and/or an inner contour of the three-dimensional object to be produced, and wherein the plurality of laser diode elements are arrangeable or arranged in groups preconfigured in the specific spatial arrangement relative to one another at predetermined arrangement positions of the mounting device.

10. The apparatus as claimed in claim 1, wherein the mounting device is movably supported in at least one degree of freedom of movement relative to the construction plane.

11. The apparatus as claimed in claim 1, wherein the mounting device is in a fixed position relative to the construction plane.

12. The apparatus as claimed in claim 1, wherein at least one of the plurality of laser diode elements is arrangeable or arranged movably on or in the mounting device in at least one degree of freedom of movement relative to the mounting device.

13. The apparatus as claimed claim 1, further comprising:
    a coater device configured to form a construction material layer in the construction plane, wherein the coater device is arranged or formed on the mounting device.

14. The apparatus as claimed in claim 1, further comprising:
    a detection device arranged or formed on the mounting device, wherein the detection device is configured to detect with respect to a construction material layer to be solidified or already solidified, at least one of: a temperature and a melt characteristic.

15. The apparatus as claimed in claim 1, further comprising:
    at least one evaluation device arranged or formed on the mounting device, wherein the at least one evaluation device is configured to evaluate with respect to a construction material layer to be solidified or already solidified, at least one of: a temperature and a melt characteristic.

16. The apparatus as claimed in claim 1, wherein the mounting device comprises a plurality of mounting device segments, wherein at least two mounting device segments are arranged movably in at least one degree of freedom of movement relative to the construction plane and/or in at least one degree of freedom of movement relative to one another.

17. The apparatus as claimed in claim 1, further comprising:
    a simulation device configured for simulating at least one object-related object parameter which is modifiable during the generative production of the three-dimensional object, and
    a control device configured to drive respective ones of the plurality of laser diode elements in a targeted manner for respectively generating respective laser beams with respective specific beam characteristics based on the at least one object-related object parameter simulated by the simulation device.

18. The apparatus as claimed in claim 17, wherein the at least one object-related object parameter comprises at least one of:
- a heat flow through the three-dimensional object which is to be or has been produced generatively, which arises during the generative production,
- a temperature or temperature distribution of the three-dimensional object which is to be or has been produced generatively, which arises during the generative production, and
- a mechanical load in the three-dimensional object which is to be or has been produced generatively, which arises during the generative production.

\* \* \* \* \*